United States Patent [19]
Hannes

[11] Patent Number: 5,371,988
[45] Date of Patent: Dec. 13, 1994

[54] MODULAR BUILDING SYSTEM AND FRAME MEMBERS

[76] Inventor: Paul Hannes, 11a, chemin du Plateau, F-67500 Haguenau, France

[21] Appl. No.: 800,939

[22] Filed: Nov. 26, 1991

[30] Foreign Application Priority Data

Nov. 28, 1990 [DE] Germany ............................ 4037871

[51] Int. Cl.$^5$ .............................................. E04C 3/00
[52] U.S. Cl. .................. 52/282.1; 52/656.1; 52/656.9; 52/710; 52/731.2; 52/731.3; 52/731.4; 403/174; 403/178; 403/217
[58] Field of Search ............................ 52/282.1–282.5, 52/656.1, 656.9, 731.2, 731.3, 731.4, 710; 403/174, 178, 217

[56] References Cited

U.S. PATENT DOCUMENTS

| | | | |
|---|---|---|---|
| 3,451,183 | 6/1969 | Lespagnol | 52/656 |
| 3,513,606 | 5/1970 | Jones | 52/27 |
| 3,559,357 | 2/1971 | Lowe | 52/282 |
| 3,866,364 | 2/1975 | Pollard | 52/282.4 |

FOREIGN PATENT DOCUMENTS

| | | |
|---|---|---|
| 0010475 | 5/1979 | European Pat. Off. . |
| 0136431 | 4/1985 | European Pat. Off. . |
| 1919678 | 4/1965 | Germany . |
| 8137388 | 12/1981 | Germany . |

*Primary Examiner*—Carl D. Friedman
*Assistant Examiner*—Christopher T. Kent
*Attorney, Agent, or Firm*—Darby & Darby

[57] ABSTRACT

A modular building system having two or more elongated hollow profiled frame members and female and/or male fasteners which separably connect the frame members to each other. Each frame member has smooth, plane and at least substantially uninterrupted external surfaces, at least one longitudinally extending stiffening core with a longitudinally extending at least partially tapped hole, at least one longitudinally extending outer wall adjacent an external surface and spaced apart from the core, and at least one pair of longitudinally extending sidewalls which connect the core with the outer wall. The outer wall, the core and the sidewalls define a longitudinally extending chamber which is located between the outer wall and the core and is flanked by the sidewalls. Male fasteners can extend transversely of the outer wall and core and into the holes in the cores of adjacent frame members or into transversely extending tapped bores of adjacent frame members.

37 Claims, 15 Drawing Sheets

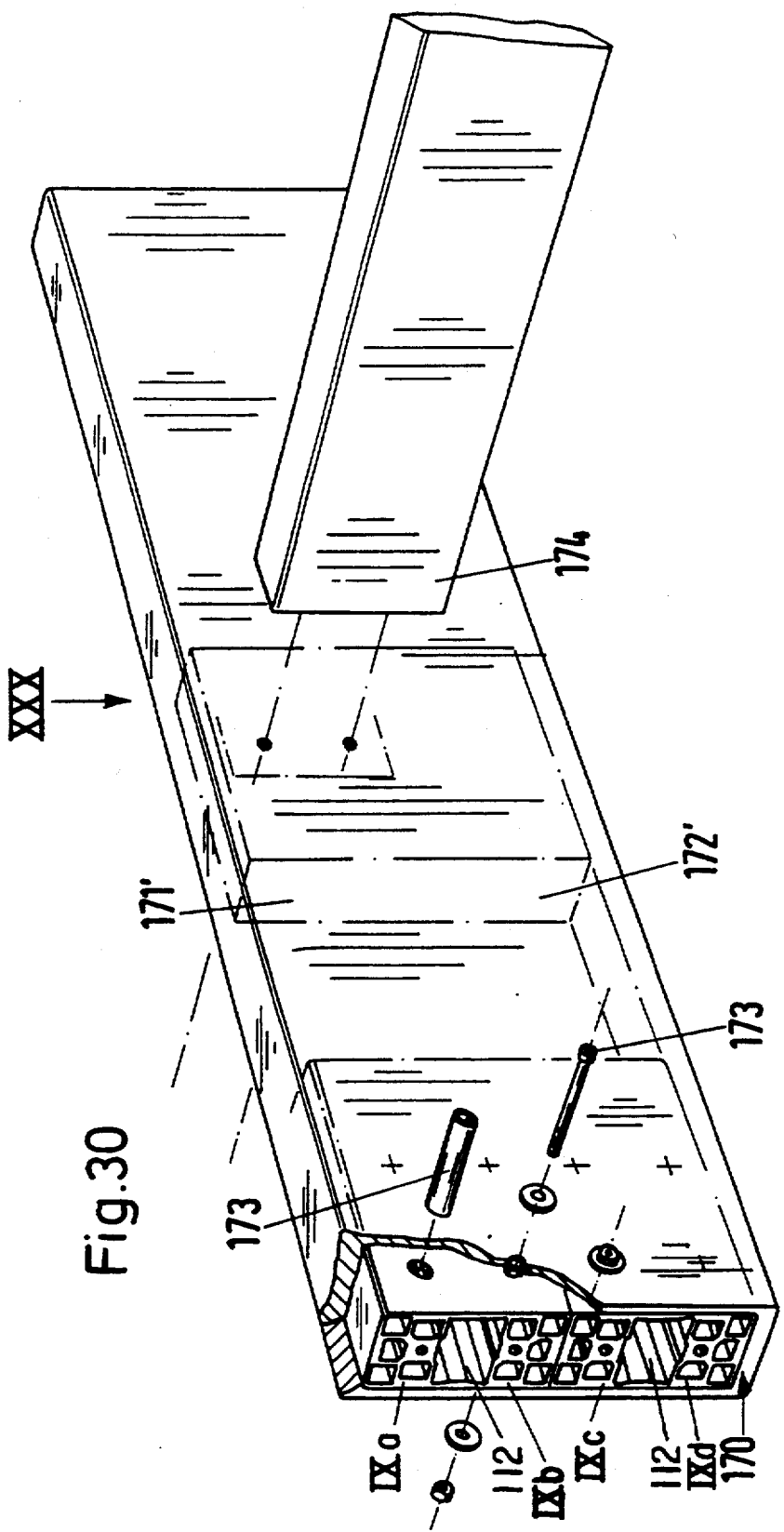

MODULAR BUILDING SYSTEM AND FRAME MEMBERS

BACKGROUND OF THE INVENTION

The invention relates to improvements in modular building systems (also called structural frameworks or sectional frames) in general, and more particularly to improvements in modular building systems and in components of modular building systems of the type disclosed, for example, in published European patent application No. 0 010 475, in European Pat. No. 0 136 431, in U.S. Pat. Nos. 3,451,183, 3,513,606 and 3,559,357, and in German Utility Model No. 19 19 678.

Modular building systems of the type referred to in the above-enumerated application, Utility Model and patents normally utilize elongated profiled frame members which are made of light metal and have smooth, substantially plane longitudinally extending external surfaces as well as at least one longitudinally extending core which is provided with at least one longitudinally extending hole. Each frame member further comprises at least one longitudinally extending chamber and walls which surround the chamber and are connected to each other as well as to the core. The frame member which is described and shown in European patent application No. 0 010 475 is provided with two chambers which are disposed at opposite sides of the core and communicate with longitudinally extending grooves in the external surfaces of the frame member. Each chamber is surrounded by a split undercut outer wall having a generally C-shaped cross-sectional outline and by two internal walls which extend radially of the core and separate the chambers from each other. If one wishes to assemble two frame members into a building system wherein the frame members extend at right angles to each other, it is necessary to employ a bolt having a head which is sufficiently small to pass through the groove in one of the outer walls of one frame member. The shank of the bolt is caused to pass through a transverse hole of the core in the one frame member, through the groove in the other outer wall and axially into the hole of the core of the other frame member. This establishes a connection which maintains one end face of the other frame member in abutment with an external surface of the one frame member. The head of the bolt bears against the core of the one frame member and can be reached by the working end of a suitable tool which is used to rotate the bolt, either in a direction to drive the shank axially into the core of the other frame member or to disengage the shank from the other frame member. A drawback of the frame members which are disclosed in European patent application No. 0 010 is that their resistance to deforming stresses is rather limited, particularly the resistance of those portions of the outer walls which are adjacent the respective longitudinally extending grooves. Such deforming stresses arise in response to the push or pull of the bolt when the latter is driven home with a substantial force. A pronounced pull entails deformation of the core and of the internal walls, and a pronounced push entails deformation of the outer walls. In addition, frame members of the just outlined character exhibit a rather limited resistance to torsional stresses.

German Utility Model No. 19 19 678 discloses a frame member which has a square cross-sectional outline with a centrally located elongated core having a longitudinally extending hole, with four outer walls each of which has a centrally located longitudinally extending groove, with four longitudinally extending chambers which surround the core and each of which communicates with one of the grooves, and with four diagonally extending internal walls which separate the neighboring chambers from each other and each of which extends from a corner of the core to a corner between two neighboring outer walls. Each chamber has a trapeziform cross-sectional outline, and the halves of two outer walls which are connected to the outermost portion of a diagonal internal wall resemble an arrowhead. If a first frame member is to be separably connected with a second frame member in such a way that one end face of the second frame member abuts an external surface of the first frame member, one employs a threaded fastener in the form of a bolt or screw with a head which is slid into one chamber of the first frame member. The shank of the fastener extends outwardly through the respective groove add axially into the hole in the core of the second frame member. The head of the fastener bears against the internal surface of the corresponding outer wall at both sides of the respective groove and is likely to deform the two halves of such outer wall in response to the application of a force which pulls the end face of the second frame member away from the adjacent external surface of the first frame member. Furthermore, the diagonal walls between the chambers are incapable of standing pronounced flexing stresses, the same as the core, so that such frame members exhibit a very low resistance to compressive as well as torsional stresses. For example, a relatively small force which tends to move one grooved outer wall toward a grooved outer wall opposite the one outer wall entails pronounced flattening of the frame member with attendant widening of grooves in the one and the other outer wall and with equally pronounced narrowing of the grooves or gaps in the other two outer walls. The ability of the just described frame members to withstand torsional, compressive and/or other stresses does not improve if they are provided with several cores and/or with differently oriented internal walls between neighboring chambers.

OBJECTS OF THE INVENTION

An object of the invention is to provide a novel and improved profiled frame member which can be utilized in modular building systems and can stand pronounced deforming stresses due to its design rather than as a result of an increase in weight and/or bulk.

Another object of the invention is to provide a frame member which exhibits many advantages but none of the drawbacks of heretofore known frame members.

A further object of the invention is to provide a novel and improved distribution of walls and chambers in the above outlined frame member.

An additional object of the invention is to provide a frame member which is more versatile than heretofore known frame members.

Still another object of the invention is to provide a frame member which can stand more pronounced compressive, bending, twisting and many other types of stresses than heretofore known frame members.

A further object of the invention is to provide a relatively simple and inexpensive frame member which is of eye-pleasing appearance and can be assembled with identical, similar and/or different frame members to form modular building systems of desired size, shape and/or strength.

Another object of the invention is to provide a novel and improved method of assembling the above outlined frame member with similar, identical and/or different frame members into modular building systems of desired size, shape and/or strength.

An additional object of the invention is to provide a novel and improved modular building system or structural framework which embodies two or more frame members of the above outlined character.

A further object of the invention is to provide a building system which is more resistant to torsional, compressive, tensional and/or other stresses than building systems which employ conventional frame members.

Another object of the invention is to provide novel and improved connections between neighboring frame members of the above outlined building system.

A further object of the invention is to provide a building system which can be put to a practically unlimited number of different uses, which can be rapidly assembled or taken apart, and which can be assembled or taken apart by employing relatively simple, inexpensive and readily available tools.

SUMMARY OF THE INVENTION

One feature of the present invention resides in the provision of a hollow profiled frame member for use in a modular building System or erector system. The frame member includes an elongated body having a polygonal cross-sectional outline and a plurality of at least substantially plane longitudinally extending external surfaces which are devoid of longitudinally extending open-ended grooves. The body of the frame member comprises at least one longitudinally extending core having at least one longitudinally extending hole, at least one outer wall adjacent one of the external surfaces and spaced apart from the at least one core, and at least one pair of longitudinally extending sidewalls spaced apart from each other and connecting the at least one core with the at least one outer wall. The walls (i.e., the at least one outer wall and the at least one pair of sidewalls) define an elongated chamber which is disposed between the at least one core and the at least one outer wall and is flanked by the at least one pair of sidewalls.

It is presently preferred to make the body of the frame member of aluminum or another suitable light metal or alloy.

The body of the frame member can comprise at least one additional outer wall which is adjacent another of the external surfaces and is spaced apart from the at least one core, and at least one additional pair of sidewalls which are spaced apart from each other and connect the at least one core with the at least one additional outer wall. The at least one core and the additional walls define an elongated second chamber which is disposed between the at least one core and the at least one additional outer wall and is flanked by the at least one additional pair of sidewalls. One sidewall of each pair of sidewalls has a first face adjacent the respective chamber and a second face opposite the respective first face. The first faces are disposed in first planes which are at least immediately adjacent the at least one core, and the second faces are disposed in second planes which bypass the at least one core. The sidewalls of each pair of sidewalls are or can be at least substantially normal to the respective outer walls, and the at least one core can be provided with facets one of which is at least substantially parallel to the first plane and another of which is at least substantially parallel to the second plane.

At least one wall of a frame member including a core, an outer wall and a pair of sidewalls can be provided with at least one inlet (e.g., a longitudinally extending slot) for admission of at least a portion of a fastener (e.g., for admission of a nut or at least the head of a screw or bolt into the respective chamber.

The sidewalls of the body of the frame member can comprise confronting substantially wedge-like portions with mutually inclined facets which are adjacent the chamber and are of one piece with the core.

In accordance with a first presently preferred embodiment of the invention, the body of the frame member has a single core and a single chamber.

In accordance with another presently preferred embodiment, the body of the frame member has a single core and two chambers which are disposed at opposite sides of the single core.

It is further within the purview of the intention to construct the body of the frame member in such a way that the body comprises at least one additional outer wall and an additional pair of sidewalls which connect the at least one core with the at least one additional outer wall. The additional walls and the at least one core define a second longitudinally extending chamber, and the sidewalls of the at least one pair are inclined relative to the sidewalls of the additional pair of sidewalls. The body is further provided with an elongated channel or tunnel which is disposed between one sidewall of the at least one pair and one sidewall of the additional pair. The body includes at least one corner portion, and the channel is preferably provided in the corner portion of the body.

In accordance with a further presently preferred embodiment, the body of the frame member has first, second and third elongated chambers and two elongated channels. The at least one core is disposed between the first and third chambers, and the second chamber is disposed between the channels. One of the channels is disposed between the first and second chambers, and the other channel is located between the second and third chambers, The first and third chambers have halves which are mirror symmetrical to each other with reference to a first plane, and the second chamber has two halves which are mirror symmetrical to each other with reference to a second plane extending at right angles to and crossing the first plane, for example, along the axis of the hole in the at least one core.

In accordance with still another presently preferred embodiment, the body has four longitudinally extending chambers and four longitudinally extending channels. The chambers and the channels surround the at least one core, and the channels alternate with the chambers. The chambers include a first pair and each chamber of the first pair has two halves which are mirror symmetrical to each other with reference to a first plane that halves the at least one core, and the chambers further include a second pair with each chamber of the second pair including two halves which are mirror images of each other with reference to a second plane extending at right angles to the first plane and halving the at least one core. The channels include a first pair of channels and the channels of the first pair have halves which are mirror images of each other with reference to a third plane halving the at least one core and making angles of 45 degrees with the first and second planes, and the channels further include a second pair of channels with the channels of the second pair including halves which are mirror symmetrical to each other with reference to a fourth plane that halves the at least one core and is normal to the third plane.

In accordance with another presently preferred embodiment, the body of the frame member has two parallel elongated sections each of which includes a core. The cores of the two sections are mirror images of each other with reference to a plane which is disposed between and is spaced apart from the cores. The body has an elongated passage which is disposed between the two cores and halved by the aforementioned plane. The body further comprises intermediate walls which flank the passage and are spaced apart from the cores. Each of the two sections can further comprise first, second and third longitudinally extending chambers and two elongated channels. Each core is disposed between the first and third chambers of the respective section and the second chamber of each section is disposed between the respective channels. One channel of each section is located between the respective first and second chambers, and the other channel of each section is disposed between the respective second and third chambers.

In accordance with still another presently preferred embodiment, the body of the frame member has two pairs of corners and includes a first section at each of the corners and at least two second sections between the two pairs of corners. Each first section includes a core, two chambers and an elongated channel which is flanked by the respective chambers. Each second section can include a single core and a single chamber. Each channel is or can be immediately adjacent the respective corner. If the body has a rectangular cross-sectional outline, i.e., if the external surfaces include two wider and two narrower external surfaces, the second sections can include at least one first section adjacent one of the wider external surfaces and at least one second section adjacent the other wider external surface. Such body can further include internal reinforcing walls which are preferably distributed in such a way that each section of the body is connected with at least one other section by at least one reinforcing wall.

In accordance with another presently preferred embodiment, the body of the frame member has at least five external surfaces and at least five corners each of which is flanked by two external surfaces. Such body comprises at least five sections, one for each external surface and each including a single core and a single chamber which is disposed between the respective core and the respective external surface. The cores jointly define a substantially centrally located passage, and the body is preferably formed with a longitudinally extending channel at each of its corners. Each such channel is flanked by two sections of the body.

The body can be provided with a recess in one of its external surfaces, and such recess preferably extends at least to the at least one core (or into such core) and is dimensioned to receive a head of a threaded fastener (such as a bolt or a screw). The hole of the at least one core can be tapped, either entirely or in part, to mesh with a shank of a threaded fastener. A bottom surface in the recess can serve as an abutment for the head of a fastener. A second external surface which is located opposite the external surface having a recess for the head of a fastener can be provided with an opening dimensioned to permit passage of a shank of such fastener.

A transversely extending recess of the body can include a first portion in the at least one outer wall, and a second portion in the at least one core. The first portion of such recess can be dimensioned to receive a head of a threaded fastener, and the second portion of such recess is then dimensioned to permit introduction of a shank of such threaded fastener. An additional outer wall opposite the at least one outer wall can be outwardly adjacent a second chamber between such additional outer wall and the at least one core, and the recess can include a third portion which is provided in the additional outer wall and is dimensioned to permit introduction of the shank of the threaded fastener.

The at least one core can be provided with a transversely extending recess which is dimensioned to permit the head of a threaded fastener to enter the chamber so that the head comes into abutment with the at least one outer wall within the chamber. Such outer wall is then provided with an opening for a shank of the threaded fastener while the head of the fastener abuts the at least one outer wall and is located in the chamber.

The at least one inlet for introduction of an internally threaded fastener (e.g., a nut) into the chamber can be provided in the at least one outer wall. The sidewalls of the at least one pair can be provided with mutually inclined facets which are adjacent the at least one core and are disposed in the chamber to constitute abutments for a substantially complementary facet (e.g., a convex facet) of an internally threaded fastener in the chamber. The chamber is or can be dimensioned to permit changes of orientation of the fastener which enters the chamber by way of the inlet.

Another feature of the invention resides in the provision of a modular building system or erection system or kit which comprises at least two adjacent mutually inclined elongated frame members. At least one of these frame members includes an elongated body having a plurality of at least substantially plane longitudinally extending external surfaces which are devoid of longitudinally extending grooves. The body comprises at least one longitudinally extending core having a longitudinally extending at least partially tapped hole, at least one outer wall adjacent one of the external surfaces and spaced apart from the at least one core, and at least one pair of sidewalls which are spaced apart from each other and connect the at least one core with the at least one outer wall. The walls and the at least one core define a longitudinally extending chamber which is disposed between the at least one outer wall and the at least one core and is flanked by the at least one pair of sidewalls. The other frame member has an end face which is adjacent an external surface of the one frame member, and the building system further comprises a threaded fastener having a head anchored in a transverse recess of the one frame member and an externally threaded shank extending into the hole of the at least one core of the other frame member.

A further feature of the invention resides in the provision of a modular building system which comprises at least two mutually inclined elongated frame members. At least one of these frame members includes an elongated body having a plurality of at least substantially plane longitudinally extending external surfaces which are devoid of longitudinally extending open-ended grooves. The body comprises at least one longitudinally extending core having a longitudinally extending hole, at least one outer wall adjacent one of the external surfaces and spaced apart from the at least one core, and at least one pair of sidewalls which are spaced apart from each other and connect the at least one core with the at least one outer wall. The walls and the at least one core define a longitudinally extending chamber which is disposed between the at least one outer wall and the at least one core and is flanked by the at least one pair of sidewalls. One external surface of the at least one frame member abuts or is adjacent an external surface of the other frame member, and the building system further comprises at least one fastener which separably secures the frame members to each other. The fastener has a head which is anchored in a transversely extending recess of the one frame member and an externally threaded shank which extends into a tapped bore provided in the at least one outer wall and/or in the at least one core of the other frame member.

An additional feature of the invention resides in the provision of a modular building system which comprises a hollow first elongated frame member having first and second external surfaces which are disposed opposite each other, and a transversely extending substantially keyhole shaped slot disposed between the two external surfaces and including a wider portion and a narrower portion. The building system further comprises a second elongated frame member having an end face adjacent the first external surface, and a first threaded fastener having a head dimensioned to enter the hollow first frame member through the wider portion of the keyhole shaped slot and a shank extending through the narrower portion of the keyhole shaped slot in the first external surface and into a tapped hole in the end face of the second frame member. The second frame member has a second slot which is adjacent its end face and is also adjacent the wider portion of the keyhole shaped slot in the first external surface, and the building system further comprises a third elongated frame member having an end face adjacent the second external surface of the first frame member, and a second threaded fastener having a head which is dimensioned to enter the hollow first frame member through the wider portion of the keyhole shaped slot and a shank extending through the narrower portion of the keyhole shaped slot in the second end face and into a tapped hole in the end face of the third frame member. The end slot is positioned and dimensioned to permit entry of a tool which is to be used in order to engage and rotate the head of the second fastener. At least one of the three frame members preferably includes an elongated body having a plurality of external surfaces which are devoid of longitudinally extending grooves, at least one outer wall adjacent one of the plurality of external surfaces, at least one longitudinally extending core which is spaced apart from the at least one outer wall and has a longitudinally extending hole, and at least one pair of longitudinally extending sidewalls which are spaced apart from each other and connect the at least one core with the at least one outer wall. The walls and the at least one core define a longitudinally extending chamber which is disposed between the at least one core and the at least one outer wall and is flanked by the at least one pair of sidewalls.

Still another feature of the invention resides in the provision of a frame member including an elongated duct having a polygonal (particularly rectangular) cross-sectional outline and a plurality of smooth substantially uninterrupted external surfaces, and at least one longitudinally extending profiled section in the duct. The duct has at least one opening (e.g., a tapped bore or hole) which is provided in at least one of the external surfaces for reception of at least a portion of a fastener to be used for connection of the at least one profiled section with a second frame member. The at least one profiled section can include at least one longitudinally extending outer wall adjacent one of the external surfaces, at least one longitudinally extending core spaced apart from the at least one outer wall and having a longitudinally extending hole, and at least one pair of longitudinally extending sidewalls which are spaced apart from each other and connect the at least one outer wall with the at least one core. The walls and the at least one core define an elongated chamber which is disposed between the at least one core and the at least one outer wall and is flanked by the at least one pair of sidewalls.

The novel features which are considered as characteristic of the invention are set forth in particular in the appended claims. The improved building system itself, however, both as to its construction and the mode of assembling the same, together with additional features and advantages thereof, will be best understood upon perusal of the following detailed description of certain presently preferred specific embodiments with reference to the accompanying drawing.

BRIEF DESCRIPTION OF THE DRAWING

FIG. 30 is a perspective view of a further building system which employs two elongated frame members having a rectangular cross-sectional outline.

DESCRIPTION OF PREFERRED EMBODIMENTS

Figure 1:
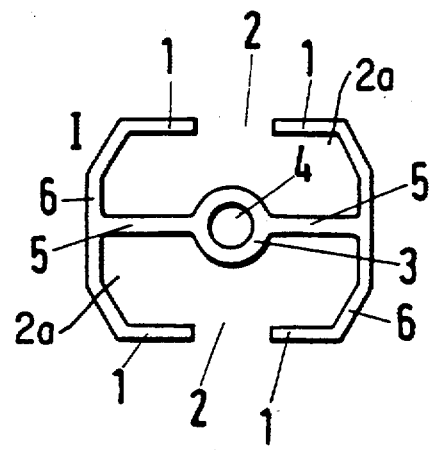
FIG. 1 is an end elevational view of a conventional frame member of the type shown in FIG. 12 of published European patent application No. 0 010 745.
Figure 2:
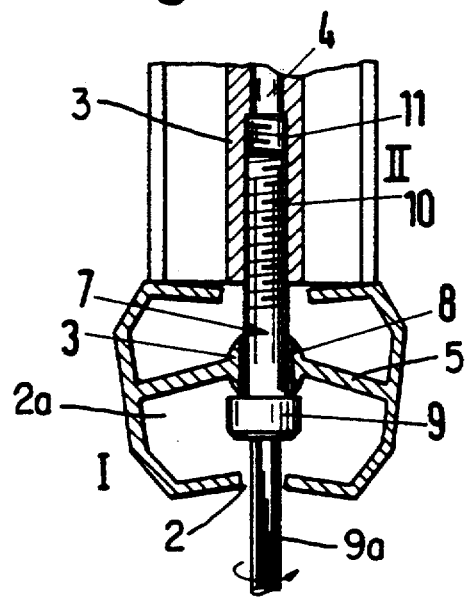
FIG. 2 is a transverse sectional view of the frame member of FIG. 1 and a fragmentary longitudinal sectional view of a similar frame member as well as an elevational view of a fastener which is used to connect the two frame members into a T-shaped or L-shaped building system.

FIGS. 1 and 2 show frame members I and II of the type described in European patent application No. 0 010 475. Each of these frame members has a first pair of parallel outer walls 1 each of which has a centrally located longitudinally extending open-ended groove 2, a second pair of outer walls 6 each having a substantially C-shaped outline and being devoid of grooves, a centrally located core 3 with a longitudinally extending circular hole 4, and two internal walls or partitions 5 connecting the core 3 with the respective outer walls 6 and being disposed between two relatively large chambers 2a each of which communicates with one of the grooves 2.

When the frame member I is to be connected to the frame member II in such a way that an end face of the frame member II abuts an external surface of the frame member I (this is shown in FIG. 2), one can employ a bolt 7 having a head 9 and an externally threaded shank 10. The head 9 can pass through the lower groove 2 of the frame member I to enter the lower chamber 2a whereby the shank 10 extends through a transverse bore 8 of the core 3 in the frame member I and can be driven into the tapped portion 11 of the hole 4 in the core 3 of the frame member II. A suitable tool 9a can be used to enter the polygonal socket of the head 9 in order to turn the bolt 7 in a clockwise direction or in a counterclockwise direction. FIG. 2 shows that the entire frame member I is distorted if the head 9 is caused to bear upon the core 3 of the frame member I with a pronounced force. The deformation involves changes in orientation of the halves of the outer walls 1 at opposite sides of the respective grooves 2, pronounced changes of orientation of the internal walls or partitions 5, narrowing of the groove 2 in the lower outer wall 1 of the frame member I in FIG. 2, and migration of the core 3 of the frame member I toward the adjacent end face of the frame member II. Another drawback of the frame members I and II is that they cannot stand pronounced torsional stresses.

Figure 2A:
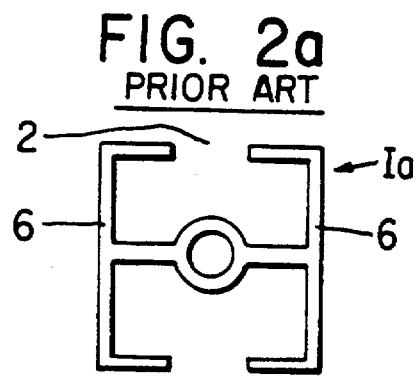
FIG. 2a is an end elevational view of a conventional frame member which constitutes a modification of the frame member of FIG. 1.
Figure 2B:
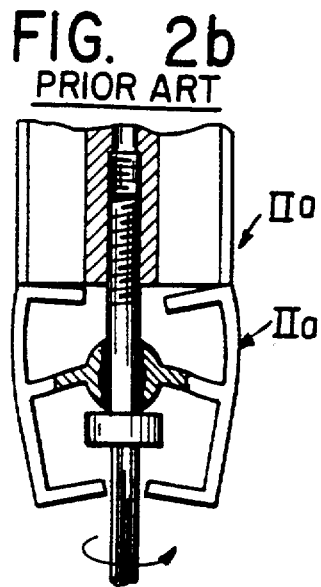
FIG. 2b shows two conventional frame members of the type illustrated in FIG. 2a, and further shows a fastener which is used to assemble the frame members into a T-shaped building system.

FIG. 2a shows a modified frame member Ia with two grooves 2 and flat outer walls 6. FIG. 2b shows a building system which is similar to that of FIG. 2 except that it employs two frame members Ia IIa of the type shown in FIG. 2a.

Figure 3:
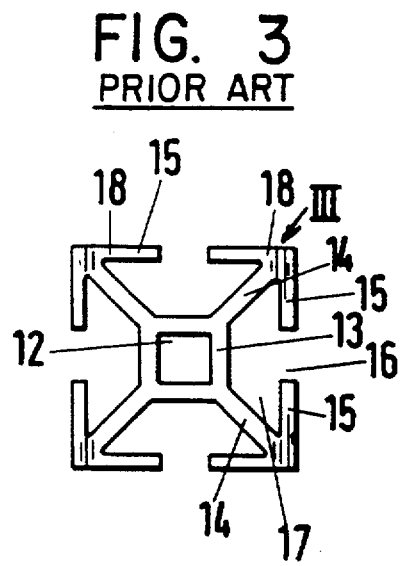
FIG. 3 is an end elevational view of a conventional frame member of the type shown in FIG. 15 of German Utility Model No. 19 19 678.
Figure 4:
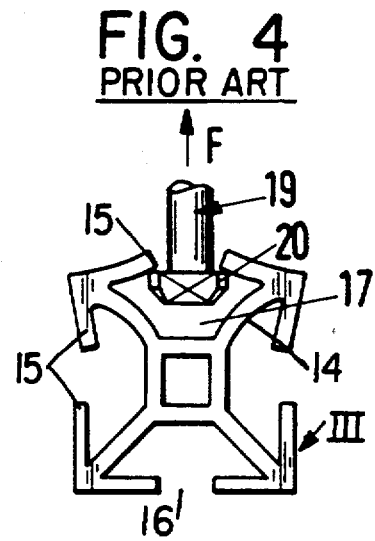
FIG. 4 illustrates the frame member of FIG. 3 subsequent to deformation of one of its outer walls by the head of a male fastener.

FIG. 3 shows a frame member III of the type described and illustrated in German Utility Model No. 19 19 678. The frame member III has a square cross-sectional outline with a centrally located core 13 having a longitudinally extending hole 12, four outer walls 15 which have centrally located open-ended grooves 16, and four diagonally extending internal walls or partitions 14 each of which connects a corner of the core 13 with a corner 18 between two neighboring outer walls 15. The frame member III has four longitudinally extending chambers 17 each of which is flanked by two internal walls or partitions 14 and each of which communicates with one of the grooves 16. The inability of the frame member III to stand pronounced tensional stresses in the direction of arrow F is shown in FIG. 4, i.e., the head 20 of a screw or bolt 19 will deform the two halves of the respective outer wall 15, the adjacent halves of the two vertically extending outer walls 15 and the adjacent partitions 14. In addition, the bolt or screw 19 will widen one of the grooves 16 and will reduce the width of two neighboring grooves.

Figure 5:
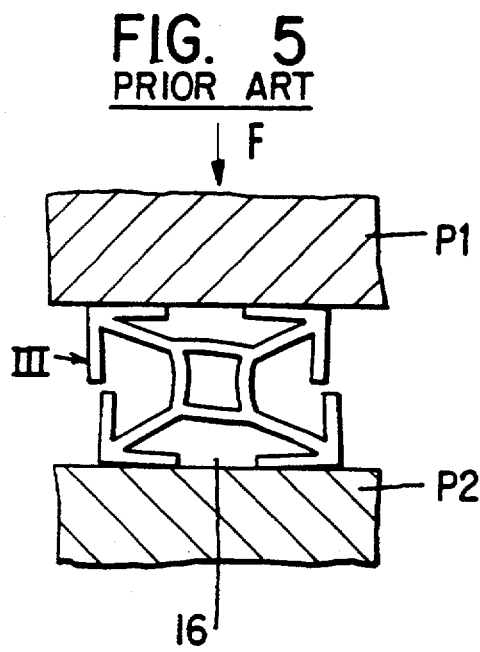
FIG. 5 illustrates the frame member of FIG. 3 subsequent to deformation between two parts which are urged toward each other.

The frame member III is incapable of standing pronounced compressive stresses. This can be seen in FIG. 5 which shows the frame member III between two parts P1, P2 while the part P1 is urged toward the other part with a force F1. This results in distortion of all constituents of the frame member III and in complete or nearly complete closing of two of the four grooves 16. In addition, the frame member III is incapable of standing pronounced torsional stresses.

Figure 5A:
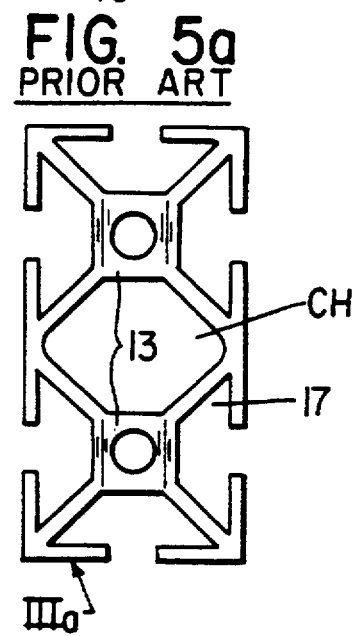
FIG. 5a is an end elevational view of a conventional frame member which constitutes a first modification of the frame member of FIGS. 3–5.

FIG. 5a shows a modified frame member IIIa with two cores 13, a total of six chambers 17 and an enclosed channel CH between the two cores.

Figure 5B:
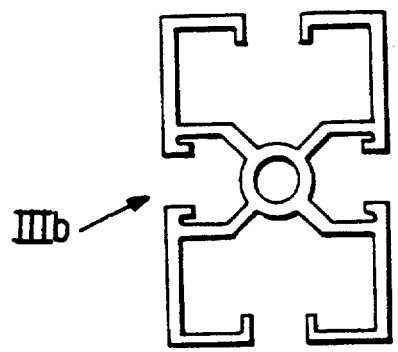
FIG. 5b is an end elevational view of a conventional frame member constituting a second modification of the frame member of FIGS. 3–5.
Figure 5C:
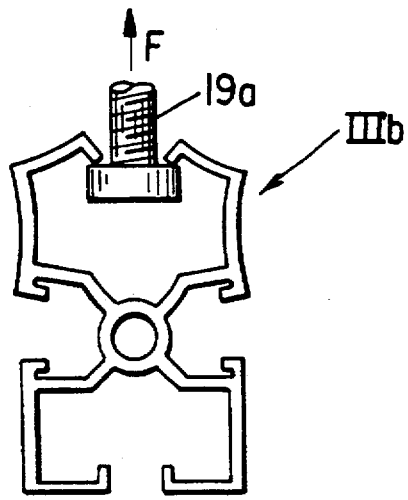
FIG. 5c shows the frame member of FIG. 5b subsequent to deformation of one of its outer walls and of certain other component parts by the head of a male fastener.

The frame member IIIb of FIG. 5b constitutes a slight modification of the frame member IIIa. FIG. 5c shows the nature and extent of deformation of the frame member IIIb in response to the application of a force F through the medium of a threaded fastener 19a.

Figure 6:
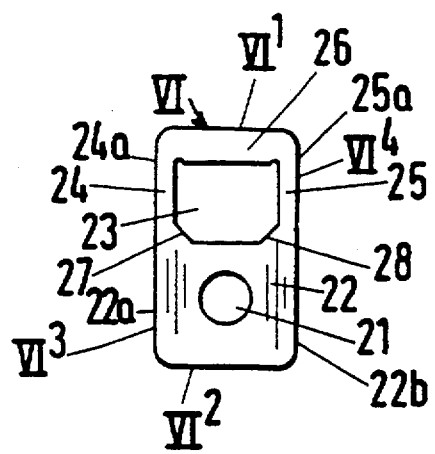
FIG. 6 is an end elevational view of a frame member which embodies one form of the invention and is provided with a single core and a single chamber.

FIG. 6 shows a frame member VI which embodies one form of the present invention. This frame member has an elongated body of light metal and includes a single longitudinally extending core 22 with a centrally located round hole 21, an outer wall 26 which is spaced apart from the core 22, and two parallel sidewalls 24, 25 which are spaced apart from each other and connect the core 22 with the respective marginal portions of the outer wall 26. The walls 24, 25, 26 and the core 22 define a longitudinally extending chamber 23 which is disposed between the core 22 and the outer wall 26 and is flanked by the sidewalls 24, 25. The body of the frame member VI has four substantially plane and smooth external surfaces VI1, VI2, VI3, VI4, one of which is adjacent the outer wall 26, two of which are adjacent the sidewalls 24, 25 and neighboring portions of the core 22, and the fourth of which is adjacent only that part of the core 22 which is remotest from the outer wall 26. The surfaces VI1-VI4 are devoid of longitudinally extending open-ended grooves, i.e., the chamber 23 is or can be completely surrounded by the core 22 and walls 24-26. This enhances the stability of the frame member VI, i.e., its ability to withstand compressive, bending or flexing, tensional and/or torsional stresses. Another important advantage of the frame member VI is that it is much less likely to gather dust and/or other contaminants because its external surfaces VI1-VI4 are not grooved and the chamber 23 is at least substantially sealed from the surrounding atmosphere. This renders the frame member VI more sanitary and enhances its versatility because such frame member can be put to use under circumstances where accumulations of dust and/or other foreign matter in and/or on building systems employing two or more interconnected frame members are not permitted for sanitary and/or other reasons. In addition, accumulations of foreign matter along the external surfaces VI1-VI4 of the improved frame member VI can be removed in a simple and time saving manner. Still further, the outer wall 26 can stand very pronounced deforming stresses because it is not grooved or slotted in a manner as shown for the outer walls of frame members I, II, Ia, IIa, III, IIIa and IIIb in FIGS. 1, 2, 2a, 2b, 3, 4, 5, 5a, 5b and 5c.

The circular hole 21 (which can be tapped, either all the way between its ends or in part) is completely surrounded by the material of the core 22, and the same holds true for the chamber 23. The core 22 is the main reinforcing or stiffening constituent of the frame member VI and enhances the stability of the outer wall 26 as well as the stability of the sidewalls 24, 25. The sidewalls 24, 25 are parallel to each other and extend at an angle of 90° to the outer wall 26. These sidewalls respectively include substantially wedge-like portions 27, 28 which are of one piece with the core 22 and have mutually inclined facets bounding the adjacent portions of the chamber 23. The external surface VI3 of the body of the frame member VI has a portion 24a which constitutes the outer side of the sidewall 24, and a portion 22a which is the outer side of the adjacent portion of the core 22. Analogously, the external surface VI4 has a first portion 25a which constitutes the outer side of the sidewall 25, and a portion 22b which is the outer side of adjacent portion of the core 22. As mentioned above, the external surfaces VI1 to VI4 are at least substantially smooth, flat and uninterrupted, i.e., they are not provided with grooves of the type shown FIGS. 1–2b (as at 2) and in FIGS. 3–5c (as at 16). The absence of such elongated open-ended grooves greatly enhances the ability of the improved frame member VI to stand all kinds of stresses irrespective of the nature of connection of such frame member with one or more similar, identical and/or different frame members.

Figure 7:
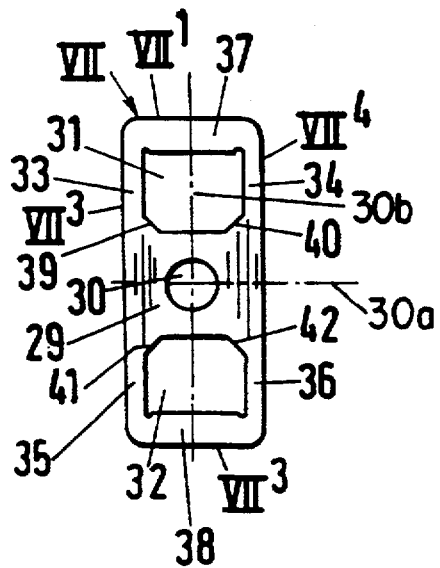
FIG. 7 is an end elevational view of a second novel frame member having a single core and two chambers.

FIG. 7 shows a frame member VII having an elongated body of light metal with four external surfaces VII1, VII2, VII3, VII4, a centrally located core 29 having a centrally located longitudinally extending hole 30, two outer walls 37, 38, two pairs of sidewalls 33, 34 and 35, 36 and two longitudinally extending chambers 31, 32. The chamber 31 is surrounded by the outer wall 37, sidewalls 33, 34 and core 29, and the chamber 32 is surrounded by the core 29, outer wall 38 and sidewalls 35, 36. The sidewalls 33, 34 have wedge like portions 39, 40 which merge into the core 29 and have mutually inclined facets bounding the adjacent portions of the chamber 31. Analogously, the sidewalls 35, 36 have wedge-like portions 41, 42 which merge into the core 29 and have mutually inclined facets bounding the adjacent portions of the chamber 32. The wedge-like portions 39–42 reinforce the respective sidewalls and contribute to the stability of the entire frame member VII. The core 29 is located between the two chambers 31, 32 which are mirror images of each other with reference to a plane 30a halving the core 29 and including the axis of the hole 30. Another symmetry plane 30b halves each of the chambers 31, 32 and the core 29 and also includes the axis of the hole 30. The external surfaces VII1–VII4 are devoid of longitudinally extending open-ended grooves or slots. The hole 30 is completely surrounded by the material of the core 29, and the chambers 31, 32 are at least substantially surrounded by the core 29 on the one hand and by the respective walls 33, 34, 37 and 35, 36, 38 on the other hand.

Figure 8:
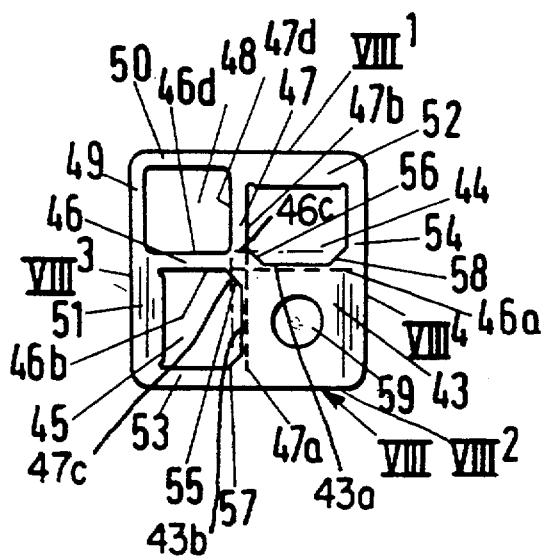
FIG. 8 is an end elevational view of a frame member which constitutes a further embodiment of the present invention and is provided with a single core, two chambers and a channel diagonally opposite the core.

The frame member VIII of FIG. 8 has an elongated metallic body with a single core 43 at one corner, two chambers 44, 45 at the two corners adjacent the corner for the core 43, and an elongated closed channel 48 at the fourth corner diagonally opposite the corner for the core 43. The latter has a centrally located hole 59 which is completely surrounded by metallic material. The body of the frame member VIII further comprises two outer walls 51, 52 and two pairs of sidewalls 47, 54 and 46, 53. The chamber 44 is surrounded by the core 43 and walls 54, 52, 47 and the chamber 45 is surrounded by the core 43 and walls 46, 51, 53. The sidewalls 47, 54 have wedge-like portions 56, 58 which merge into the core 43 and have mutually inclined facets bounding the adjacent portions of the chamber 44. The sidewalls 46, 53 have wedge-like portions 55, 57 which merge into the core 43 and have mutually inclined facets bounding the adjacent portions of the chamber 45. The channel 48 is surrounded by the sidewalls 46, 47, by an extension 50 of the outer wall 52 and by an extension 49 of the outer wall 51. The external surfaces VIII1, VIII2, VIII3, VIII4 of the body of the frame member VIII are smooth, plane and devoid of any open-ended grooves. The sidewalls 47, 54 are normal to the sidewalls 46, 53. Those faces (46b, 47b) of the sidewalls 46, 47 which are adjacent the respective chambers 45, 44 are located in planes (46a, 47a) which cross or are at least immediately adjacent the core 43. On the other hand, those faces (46d, 47d) of the sidewalls 46, 47 which face away from the respective chambers 45, 44 (namely those faces which are adjacent the channel 48) are located in planes (46c, 47c) which are spaced apart from the core 43. The latter has facets 43a, 43b which are respectively adjacent the chambers 44, 45 and are adjacent to or are located in the planes 46a, 47a, respectively.

Figure 9:
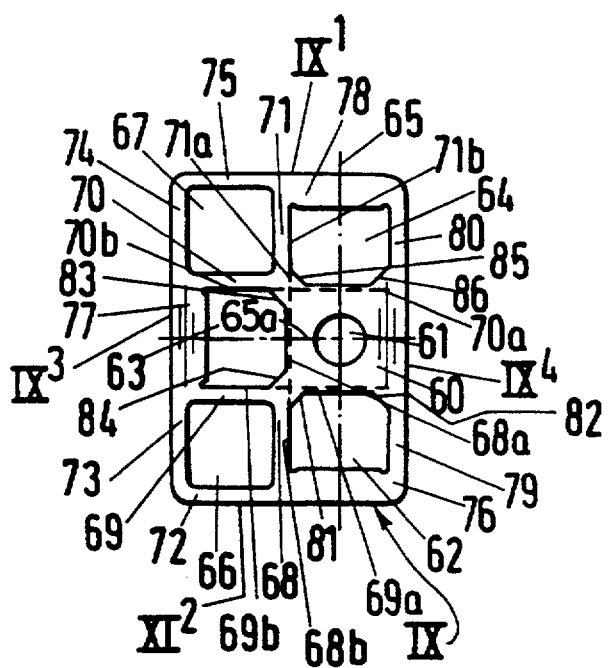
FIG. 9 is an end elevational view of a fourth improved frame member with a single core, three chambers and two channels.

FIG. 9 shows a frame member IX having an elongated metallic body with four smooth, plane and groove-free external surfaces IX1, IX2, IX3 and IX4. The single core 60 is located between a (first) chamber 62 and a (third) chamber 64, and a further (second) chamber 63 is located between two elongated parallel channels 66, 67. The channel 66 is located between the first and second chambers 62, 63 and the channel 67 is located between the second and third chambers 63, 64. The core 60 has a centrally located longitudinally extending hole 61 which is completely surrounded by metallic material; the chamber 62 is defined by the core 60, an outer wall 76 which is adjacent the external surface IX2, and two parallel sidewalls 68, 79; the chamber 63 is surrounded by the core 60, an outer wall 77 adjacent the external surface IX3 and two parallel sidewalls 69, 70; and the chamber 64 is surrounded by the core 60, and outer wall 78 adjacent the external surface IX1, and two sidewalls 71, 80. Those faces (68b, 69b) of the sidewalls 68, 69 which are adjacent the respective chambers 62, 63 are located in planes (68a, 69a) which intersect or are at least closely adjacent the core 60. Analogously, those faces (70b, 71b) of the sidewalls 70, 71 which are adjacent the respective chambers 63, 64 are located in planes (70a, 71a) which intersect or are at least closely adjacent the core 60. The sidewalls 68, 79 have wedge-like portions 81, 82 which merge into the core 60 and are provided with mutually inclined facets adjacent the respective portions of the chamber 62. The sidewalls 69, 70 have wedge-like portions 84, 83 which merge into the core 60 and have mutually inclined facets bounding the adjacent portions of the chamber 63. The sidewalls 71, 80 have wedge-like portions 85, 86 which merge into the core 60 and have mutually inclined facets bounding the adjacent portions of the chamber 64.

The channel 66 is surrounded by the sidewalls 68, 69 and by extensions 72, 73 of the outer walls 76, 77 respectively. The channel 67 is surrounded by the sidewalls 70, 71 and by extensions 74, 75 of the outer walls 77, 78, respectively.

A symmetry plane 65 halves the chambers 62, 64 (which are located diametrically opposite each other with reference to the core 60) and includes the axis of the hole 61. A second symmetry plane 65a which is normal to the plane 65 halves the chamber 63 and also includes the axis of the hole 61. The external surfaces IX1-IX4 are smooth, flat and at least substantially uninterrupted, i.e., they do not have grooves of the type shown in FIGS. 1 to 5c.

Those faces of the sidewalls 68, 69 which are adjacent the channel 66 and are respectively parallel to the faces 68b, 69b are located in planes which bypass the core 60. Analogously, those faces of the sidewalls 70, 71 which are adjacent the channel 67 and are respectively parallel to the faces 70b, 71b are located in planes which bypass the core 60, The frame member X of FIG. 10 has an elongated metallic body with a square cross-sectional outline and four smooth, plane at least substantially uninterrupted external surfaces X1, X2, X3 and X4. The body of the frame member X has a centrally located core 88, four chambers 89, 90, 91, 92 and four channels 97, 98, 99, 100. The chambers 89-92 alternate with the channels 97-100. The chambers 89, 90 are located at opposite sides of the core 88, and the latter is also disposed between the chambers 91, 92. The channels 97-100 are located at the four corners of the body of the frame member X. A symmetry plane 93 halves the chambers 89, 90 and the core 98 and includes the axis of the centrally located longitudinally extending hole 87 in the core. A second symmetry plane 94 halves the chambers 91, 92 and the core 88 and also includes the axis of the hole 87. The axis of this hole is further located in two additional symmetry planes 95, 96 Which make angles of 45° with the symmetry planes 93, 94 and are normal to each other. The plane 96 halves the channels 98, 100 and the core 88, and the plane 95 halves the core 88 and the channels 97, 99.

The body of the frame member X has two outer walls 104 which are adjacent the chambers 91, 92, and two outer walls 103 which are adjacent the chambers 89, 90. Such body further comprises four pairs of sidewalls 105, 106, one pair for each of the four chambers 89-92. Those faces (105b, 106b) of the sidewalls 105, 106 which are adjacent the respective chambers (note the chambers 89, 91 in FIG. 10) are located in planes 105a, 106a which intersect or are immediately adjacent the core 88. On the other hand, the other faces of the sidewalls 105, 106 (namely the faces which are adjacent the respective channels) are located in planes that bypass the core 88. Each channel is surrounded by two sidewalls 105, 106 and by the extensions 101, 102 of the adjoining outer walls 103, 104. The sidewalls 105, 106 have wedge-like portions 107, 108 which merge into the core 88 and have facets which are inclined relative to each other and bound the adjacent portions of the respective chambers. The outer walls 103,104 are normal to the adjacent pairs of sidewalls 105, 106.

Figure 11:
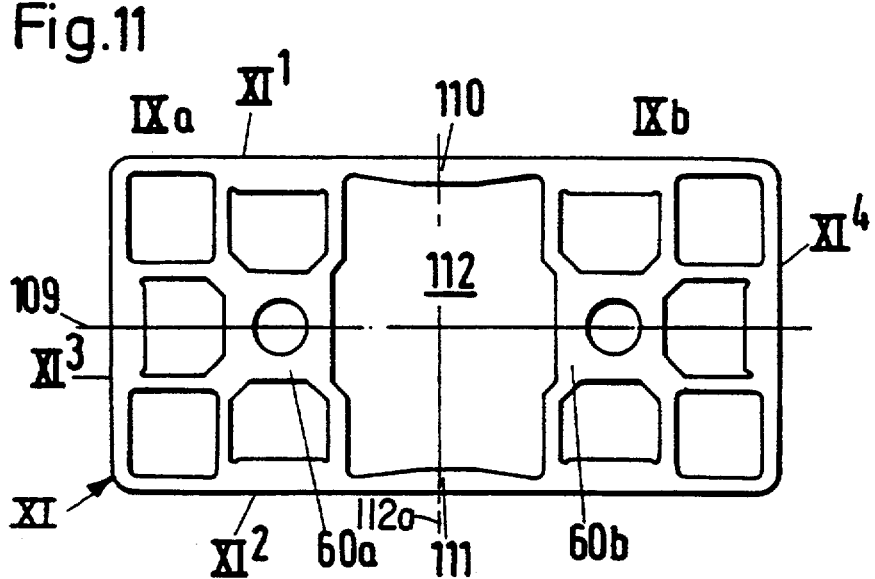
FIG. 11 is an end elevational view of a sixth improved frame member which embodies two sections each resembling or being identical with the frame member of FIG. 9.

The body of the frame member XI which is shown in FIG. 11 has a rectangular cross-sectional outline with four elongated, plane, smooth and at least substantially uninterrupted external surfaces XI1, XI2, XI3, XI4. This body has two sections IXa, IXb which are respectively adjacent the narrower external surfaces XI3, XI4, each of which is identical with the frame member IX of FIG. 9 and which are mirror images of each other relative to a plane 112a disposed between and spaced apart from the cores 60a, 60b of the respective sections IXA, IXb. These cores are separated from each other by a relatively large longitudinally extending internal passage 112 which is halved by the symmetry plane 112a and is located between two parallel intermediate walls 110, 111 serving to connect the sections IXa and IXb to each other. The two cores 60a, 60b have a common symmetry plane 109 corresponding to the symmetry plane 65a of FIG. 9.

Figure 12:
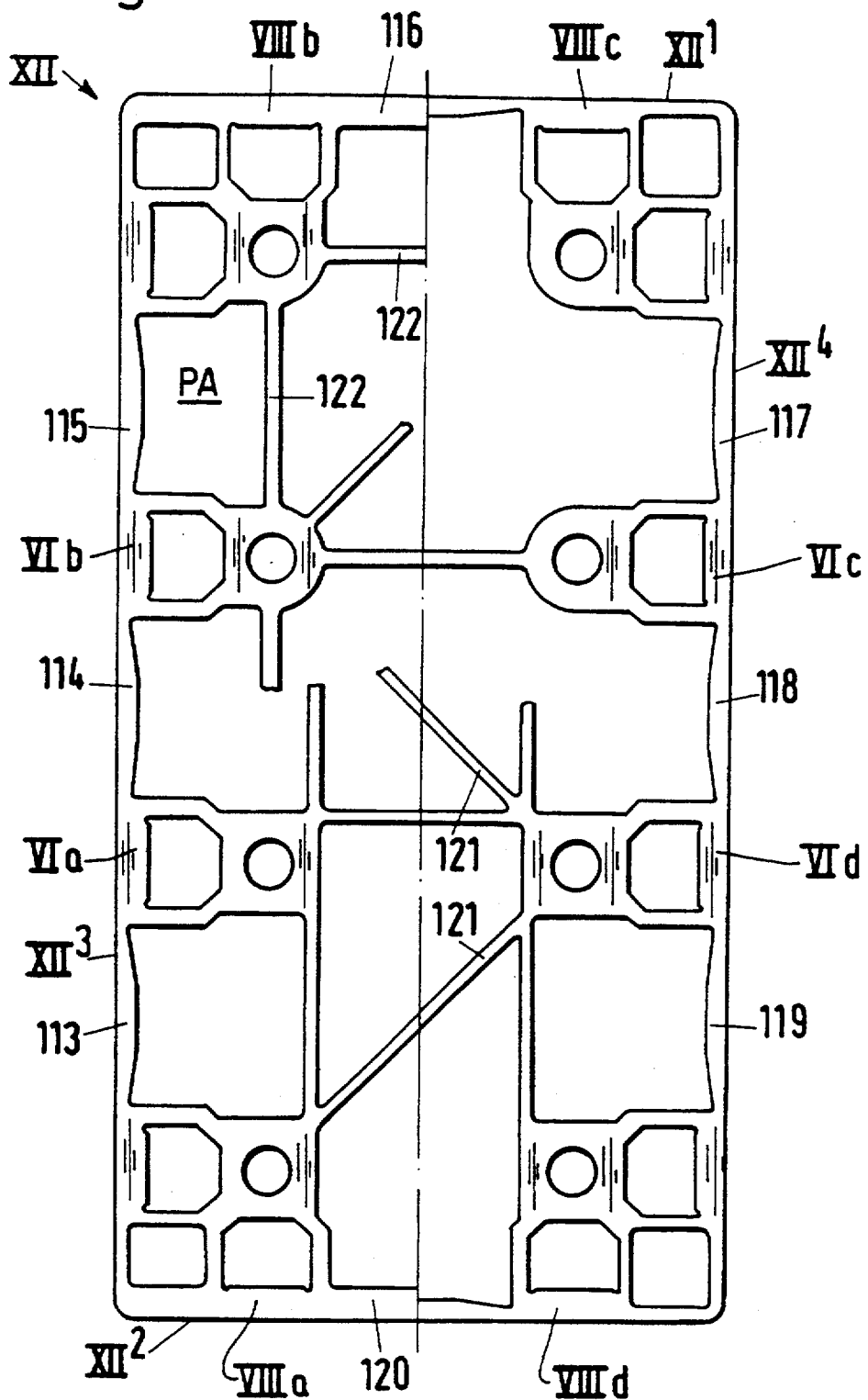
FIG. 12 is an end elevational view of a composite frame member including four sections constituted by frame members of the type shown in FIG. 8 and four sections constituted by frame members of the type shown in FIG. 6.

FIG. 12 shows a composite frame member XII having a body which is made of a metallic material and has a rectangular cross-sectional outline. The body has four first sections VIIIa, VIIIb, VIIIc, VIIId, one at each of the four corners, and four second sections VIa, VIb, VIc, VId which are adjacent the two wider smooth, plane and substantially uninterrupted external surfaces XII3, XII4 of the frame member XII. Intermediate walls 113, 114, 115 are adjacent the external surface XII3 between the sections VIIIa–VIa, VIa–VIb and VIb–VIIIb, respectively. Intermediate walls 117, 118, 119 are adjacent the external surface XII4 between the sections VIIIc–VIc, VIc–VId and VId–VIIId, respectively. The frame XII further comprises an intermediate wall 116 adjacent the narrower external surface XII1 between the sections VIIIb–VIIIc, and an intermediate walls 120 adjacent the narrower external surface XII2 between the sections VIIIa–VIIId. Still further, the frame member XII comprises a number of internal reinforcing walls or ribs 121,122. The reinforcing walls 121 extend substantially diagonally of the body of the frame member XII, and the reinforcing walls 122 are parallel with the external surfaces XII1, XII2 or XII3, XII4. Each reinforcing wall 121, 122 connects at least one section with at least one other section.

It will be noted that the sections VIa–VId and VIIIa–VIIId each have a single core but the cross-sectional outlines of all eight cores are not identical. Thus, the cores of the sections VIIIb, VIIIc are identical but different from the cores of other sections; the cores of the sections VIb, VIc are identical or nearly identical but different from the cores of the other sections; and the cores of the sections VIa, VId, VIIIa, VIIId are identical but different from the cores of the other sections. Each of the sections VIa–VId is identical with or similar to the frame member VI of FIG. 6, and each of the sections VIIIa–VIIId is identical with or similar to the frame member VIII of FIG. 8. The body of the frame member XII is further provided with a number of passageways PA which extend longitudinally of the frame member and include portions adjacent the intermediate walls 113–120.

Figure 13:
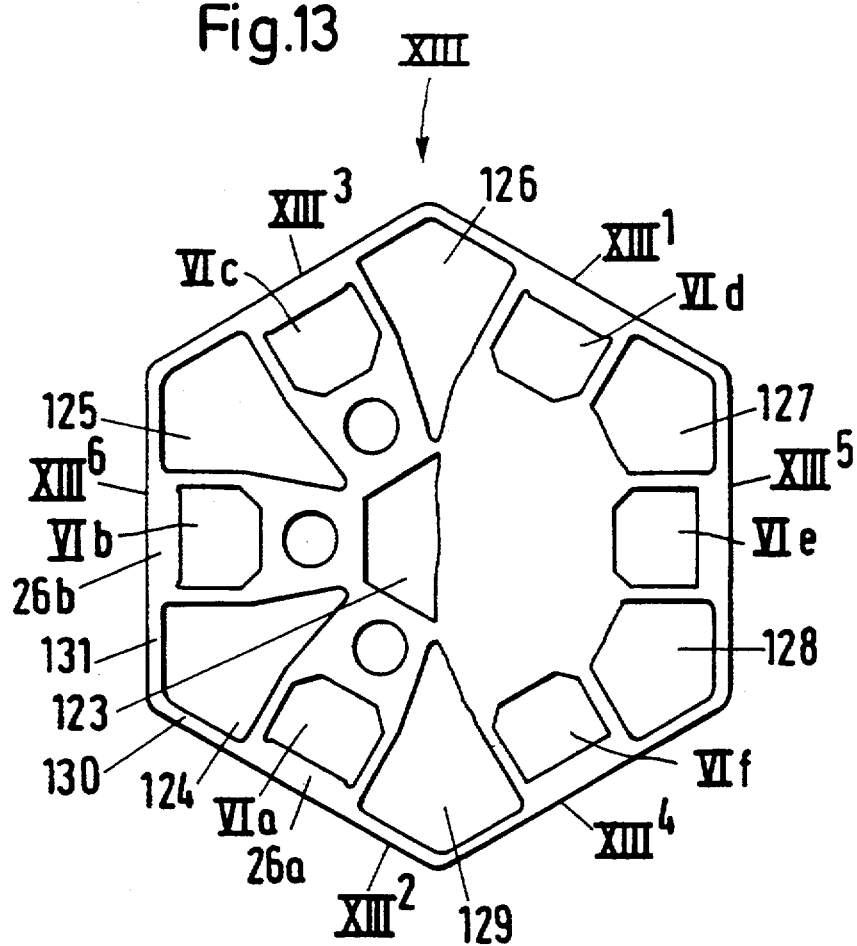
FIG. 13 is an end elevational view of a frame member having a hexagonal cross-sectional outline and comprising six sections resembling or being identical with the frame member of FIG. 6.

The frame member XIII of FIG. 13 has an elongated metallic body with six substantially uninterrupted, plane and smooth external surfaces XIII1, XIII2, XIII3, XIII4, XIII5, XIII6 each of which is adjacent one of the six sections VIa to VIf. Each of these sections resembles or is identical with the frame member VI of FIG. 6. The cores 22a, 22b, ... of the six sections VIa–VIf surround a centrally located passage 123, the outer walls 26a, 26b, ... of the six sections are adjacent the respective external surfaces, and the sidewalls of neighboring sections VIa–VIf define six channels 124 to 129, one at each of the six corners of the frame member XIII. The distribution of sections VIa–VIf is not unlike that of prongs in a six-pronged star. The channel 124 is bounded in part by extensions 130, 131 of the adjacent outer walls 26a, 26b. Similar extensions of other outer walls constitute the outer boundaries for the channels 125–129.

The frame member XIII of FIG. 13 can be modified to have a total of five, seven or more smooth, plane and at least substantially uninterrupted external surfaces.

Figure 10:
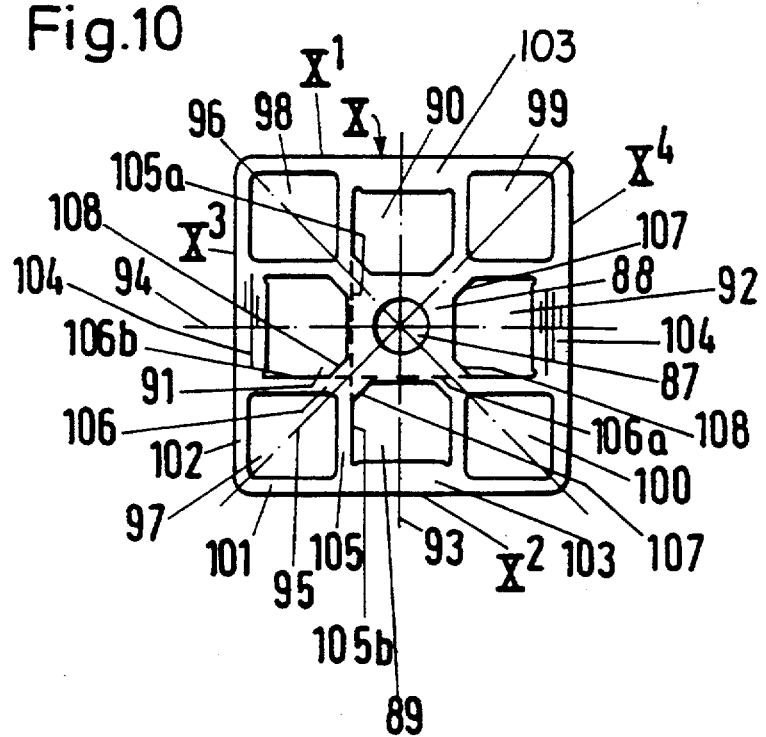
FIG. 10 is an end elevational view of a fifth improved frame member with a single core, four chambers and four channels.
Figure 14:
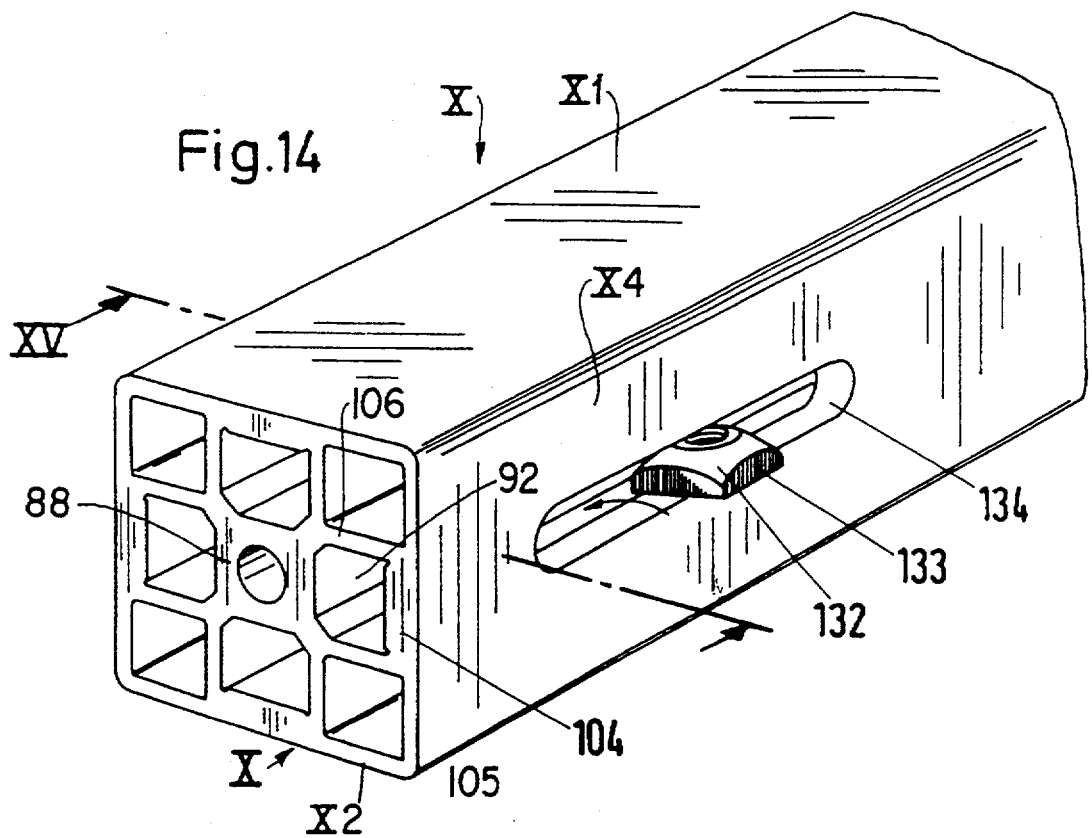
FIG. 14 is a fragmentary perspective view of a frame member of the type shown in FIG. 10 and of an internally threaded female fastener which is in the process of entering one chamber of the frame member by way of a relatively short slot-shaped inlet in one external surface of the frame member.
Figure 15:
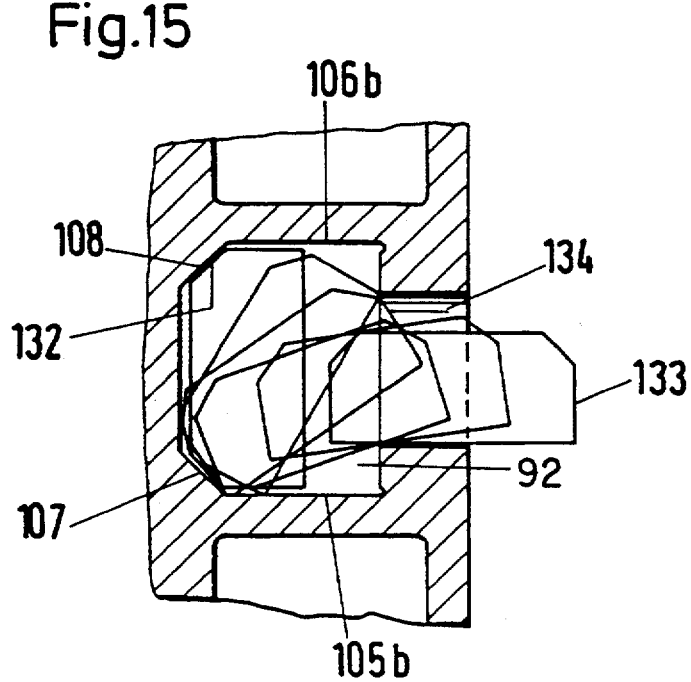
FIG. 15 is an enlarged fragmentary transverse sectional view substantially as seen in the direction of arrows from the line XV—XV in FIG. 14, showing the female fastener in two end positions and in a number of intermediate positions during and subsequent to introduction through the inlet.

FIGS. 14 and 15 illustrate the manner of introducing an internally threaded female fastener 133 in the form of a nut into the chamber 92 of a frame member X of the type shown in FIG. 10. The external surface X4 of the body of the frame member X has an elongated slot-shaped inlet 134 which is located substantially midway between the external surfaces X1 and X2 and has a width not appreciably exceeding the thickness of the female fastener 133. The latter has a convex side or facet 132 which can lie against the facets of wedge-like portions 107, 108 in the chamber 92. The dimensions of the chamber 92 are such that the orientation of the fastener 133 can be changed not later than upon completed introduction into this chamber. FIG. 15 shows that a change of orientation (through an angle of approximately or exactly 90°) can begin while the fastener 133 is in the process of entering the chamber 92 through the slot-shaped inlet 134. Such relatively short and narrow inlet does not appreciably weaken the frame member X. When the introduction and change of orientation of the fastener 133 are completed, i.e., when the facet 132 lies against the facets of the wedge-like portions 107, 108 in the chamber 92, the fastener 133 is caused to mesh with the shank of a male fastener, not shown in FIGS. 14 and 15. This will be described with reference to FIGS. 16 through 30.

The slot-shaped inlet 134 can be formed in the respective outer wall 104 in a milling or any other suitable material removing machine. Once the shank of a male fastener is brought into mesh with the internal thread of the female fastener 133, the latter is automatically centered in the chamber 92 because its convex facet 132 abuts the facets of the adjacent wedge-like portions 107, 108. The dimensions of the fastener 133 are such that, once it has been introduced into the chamber 92 through the inlet 134, and once its facet 132 abuts the wedge-shaped portions 107, 108, the fastener 133 cannot turn in the chamber 92 so that it does not share the rotational movement of the shank of a male fastener (i.e., a screw or a bolt) when the male fastener is rotated to move the external thread of its shank into or out of mesh with the internal thread of the fastener 133.

FIGS. 16 through 25 illustrate various modes of connecting two or more fasteners X with each other.

Figure 16:
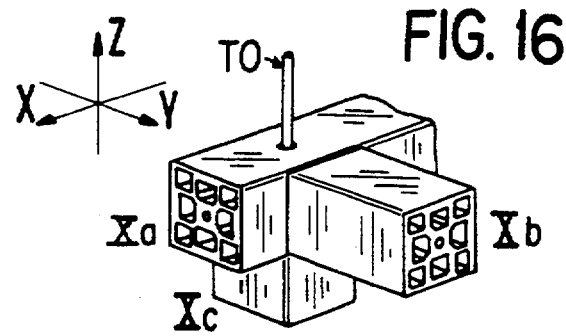
FIG. 16 is a fragmentary schematic perspective view of a modular building system which employs three frame members of the type shown in FIG. 10.
Figure 17:
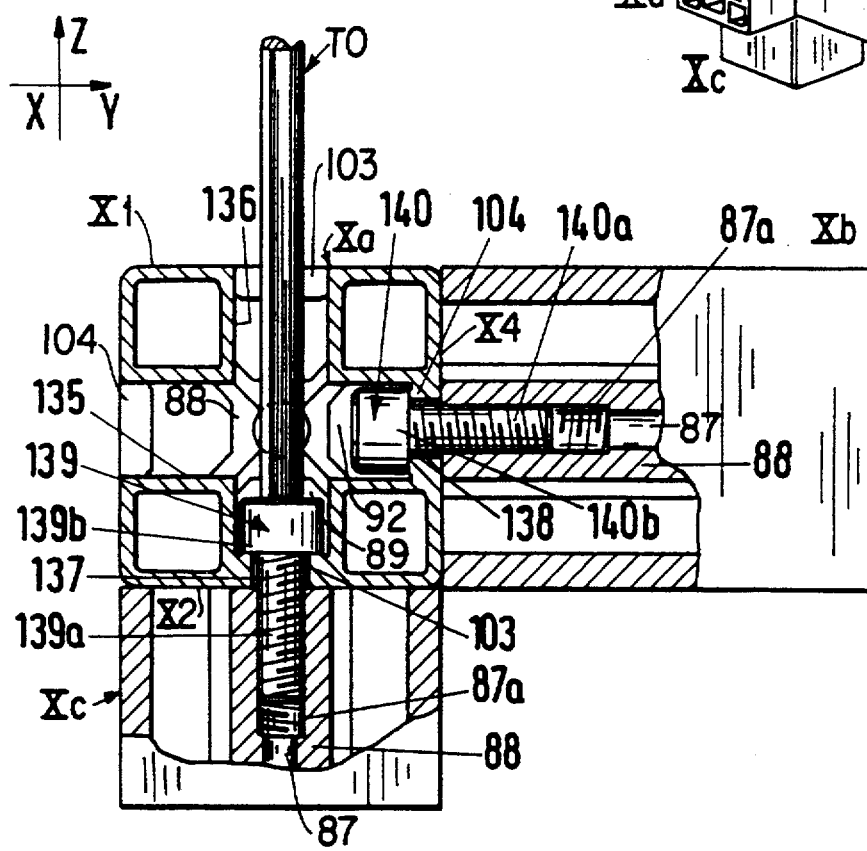
FIG. 17 is an enlarged fragmentary partly elevational and partly sectional view of the connection between the three frame members of FIG. 16, the section being taken in the direction of arrows as seen from the line XVII—XVII in FIG. 18.
Figure 18:
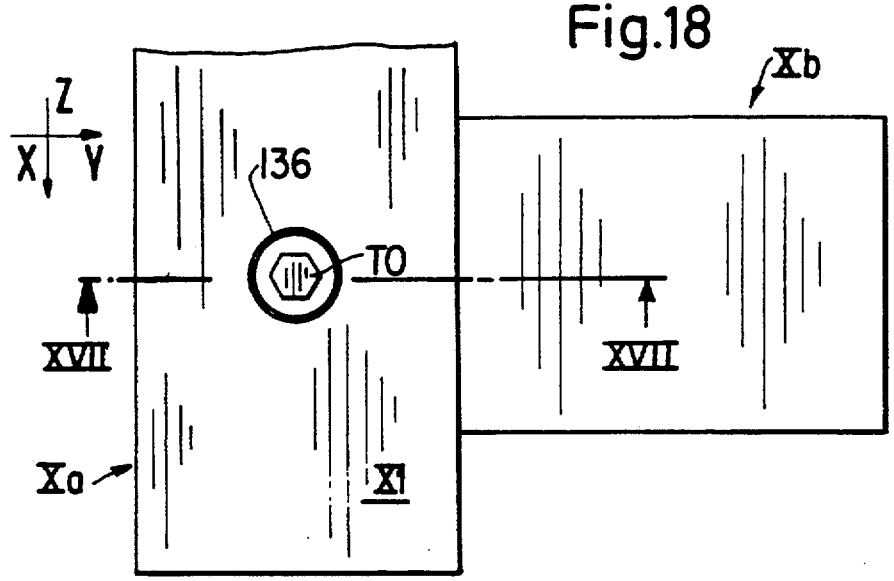
FIG. 18 is an enlarged plan view of the building system which is shown in FIG. 16.

Referring first to FIGS. 16 to 18, there is shown a modular building system-or structural framework which includes three frame members Xa (extending in the direction of axis X), Xb (extending in the direction of axis Y) and Xc (extending in the direction of axis Z), i.e., the axes of the three frame members are normal to each other. One end face of each of the frame members Xb, Xc abuts the respective external surface (X4, X2) of the frame member Xa. The frame member Xa has a first transversely extending recess 136 which extends inwardly from the external surface X1 and includes a first portion in the upper outer wall 103, a second portion in the core 88 and a third portion 137 in the lower outer wall 103. A similar transversely extending recess 135 has a first portion in the left-hand outer wall 104, a second portion in the core 88 and a third portion 138 in the right-hand outer wall 104. The third portions 137, 138 are smaller than the first and second portions of the respective recesses 136, 135. The recess 135 serves for introduction of a first male fastener in the form of a bolt 140 having a head 140b and an externally threaded shank 140a. The head 140b abuts the inner side of the right-hand outer wall 104 in the chamber 92, and the shank 140a extends through the third portion 138 of the recess 135 and into the tapped portion 87a of the central hole 87 in the core 88 of the frame member Xb.

Another male fastener 139 has an externally threaded shank 139a and a head 139b. The head 139b has passed through the first and second portions of the recess 136 and abuts the inner side of the lower outer wall 103. The shank 139a extends through the third portion 137 of the recess 136 and into the tapped portion 87a of the hole 87 in the core 88 of the frame member Xc. A tool TO is employed to rotate the head 139b or 140b. To this end, the heads 139b, 140b have customary polygonal sockets (not shown) each of which can non-rotatably receive the working end of a tool TO.

The connections between the frame members Xa-Xb and/or Xa-Xc can be established or terminated as often as desired.

Figure 19:
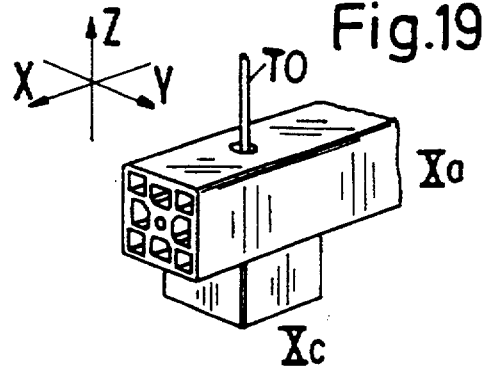
FIG. 19 is a fragmentary schematic perspective view of a modular building system which employs two frame members of the type illustrated in FIG. 10, the frame members being assembled into a T-shaped system.
Figure 20:
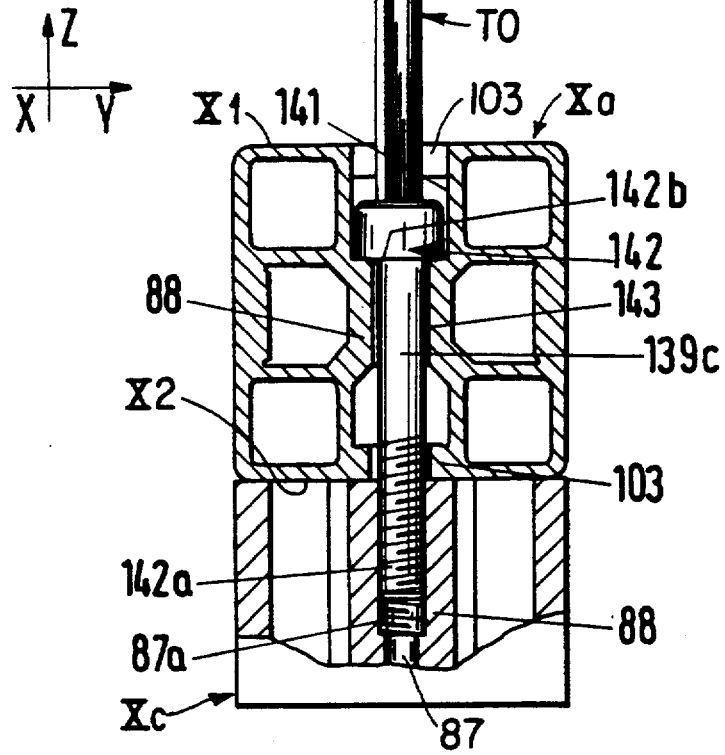
FIG. 20 is an enlarged partly elevational and partly sectional view of the connection between the frame members which are shown in FIG. 19, the section being taken in the direction of arrows as seen from the line XX—XX in FIG. 21.
Figure 21:
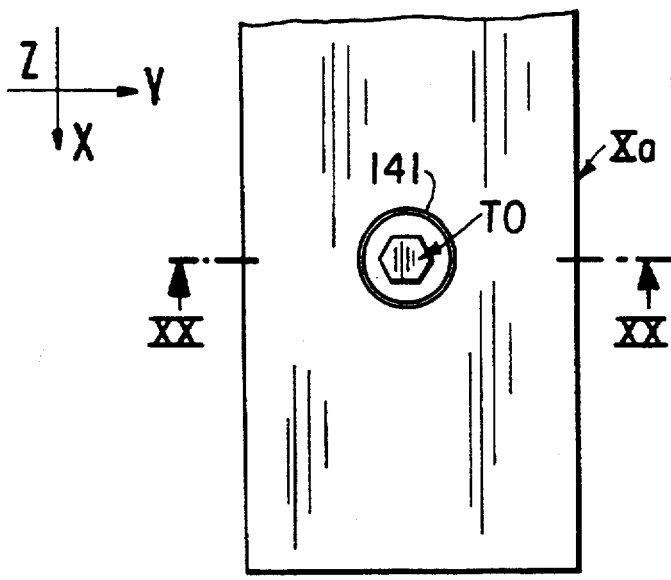
FIG. 21 is an enlarged plan view of the building system which is shown in FIGS. 19 and 20.

FIGS. 19, 20 and 21 show a modular building system including frame members Xa, Xc and a modified male fastener 142 having a head 142b and an externally threaded shank 142a. The frame members Xa and Xc respectively extend in the directions of axes X and Z, and the upper end face of the member Xc abuts the adjacent external surface X2 of the member Xa.

A transversely extending recess 141 of the frame member Xa has a larger-diameter first portion in the upper outer wall 103, a smaller-diameter second portion 143 in the core 88, and a third portion which is provided in the lower outer wall 103 and has a diameter matching or approximating that of the second portion 143. The head 142b of the male fastener 142 abuts the core 88 because it cannot enter the second portion 143 of the recess 141; however, the shank 142a is free to pass through the second and third portions of the recess 141 and into the tapped portion 87a of the centrally located hole 87 in the core 88 of the frame member Xc. The shank 142a includes a cylindrical portion 139c which does not carry an external thread and passes through the second portion 143 of the recess 141, i.e., transversely of and through the core 88 of the frame member Xa.

The first or maximum-diameter portion of the recess 141 can extend into the adjacent side of the core 88 (as actually shown in FIG. 20). If the maximum-diameter portion of the recess 141 extends all the way across the core 88 of the frame member Xa of FIGS. 19-21, this recess is converted into the recess 136 which is shown in the frame member Xa of FIGS. 16-18. The surface at the bottom of first portion of the recess 141 serves as an abutment for the head 142b of the male fastener 142.

Figure 22:
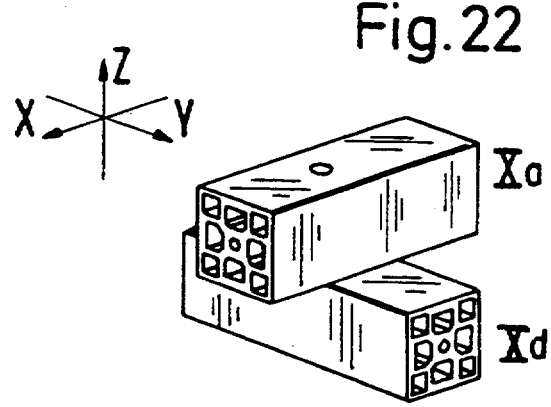
FIG. 22 is a fragmentary schematic perspective view of a building system employing two frame members of the type illustrated in FIG. 10, with the two frame members crossing each other at an angle of 90°.
Figure 23:
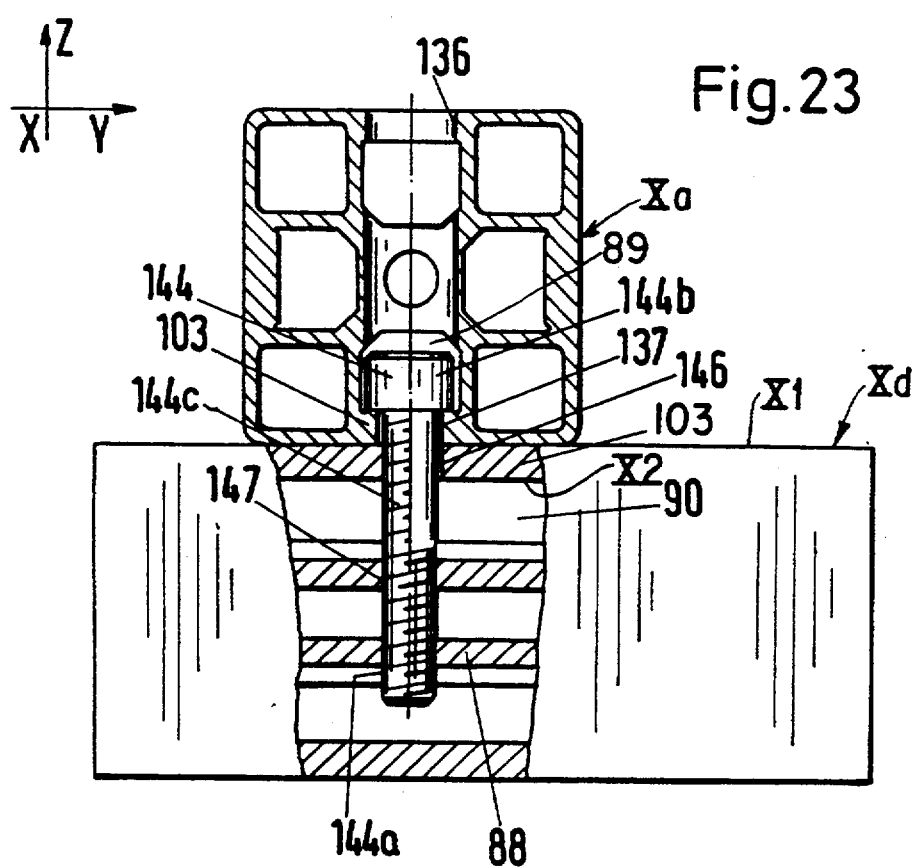
FIG. 23 is an enlarged fragmentary partly elevational and partly vertical sectional view of the connection between the frame members of FIG. 22.

FIGS. 22 and 23 show a modular building system which includes frame members Xa and Xd. These frame members cross each other, i.e., the external surface X2 of the frame member Xa (which extends in the direction of axis X) is adjacent the external surface X1 of the frame member Xd (which extends in the direction of the axis Y). The means for separably connecting the frame members Xa, Xd to each other comprises a male fastener 144 having a shank 144a and a head 144b. The shank 144a includes a smooth cylindrical portion 144c which is adjacent the head 144b, and an externally threaded portion which extends into the transversely extending tapped bore 147 in the core 88 of the frame member Xd. The recess 136 in the frame member Xa is identical with the similarly referenced recess in the frame member Xa of FIGS. 16-18. Thus, the head 144b of the fastener 144 abuts the inner side of the lower outer wall 103 of the frame member Xa. The top outer wall 103 of the frame member Xd has an opening 146 which receives the cylindrical portion 144c with at least some radial play.

If necessary, the larger-diameter portion of the recess 136 can extend into the lower outer wall 103 of the frame member Xa; the head 144b is then even closer to the external surface X1 of the frame member Xd.

Figure 24:
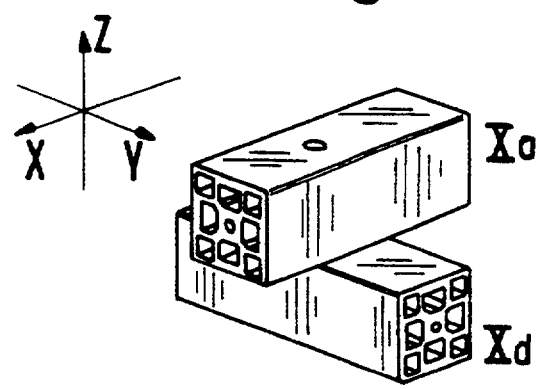
FIG. 24 is a fragmentary schematic perspective view which is similar to that of FIG. 22.
Figure 25:
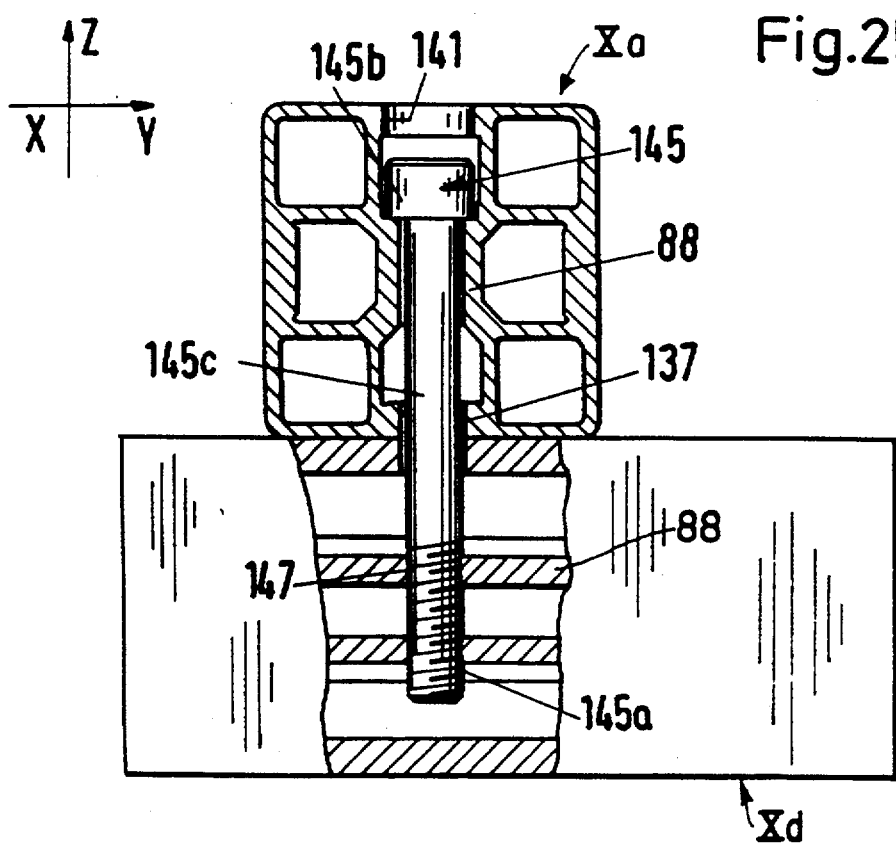
FIG. 25 is an enlarged fragmentary partly elevational and partly vertical sectional view of the connection between the frame members of FIG. 24, this connection constituting a modification of the connection which is shown in FIG. 23.
Figure 26:
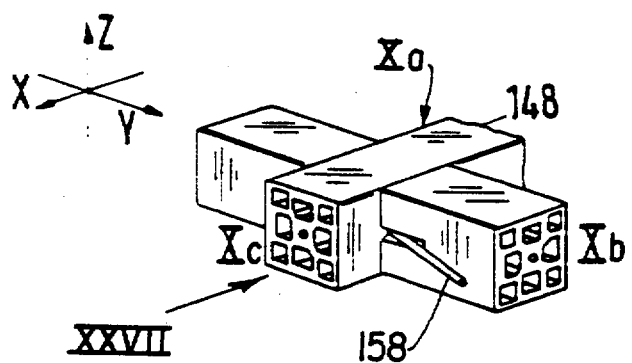
FIG. 26 is a fragmentary schematic perspective view of a modular building system which employs three frame members of the type shown in FIG. 10, two of these frame members being coaxial and extending at right angles to the third frame member.
Figure 27:
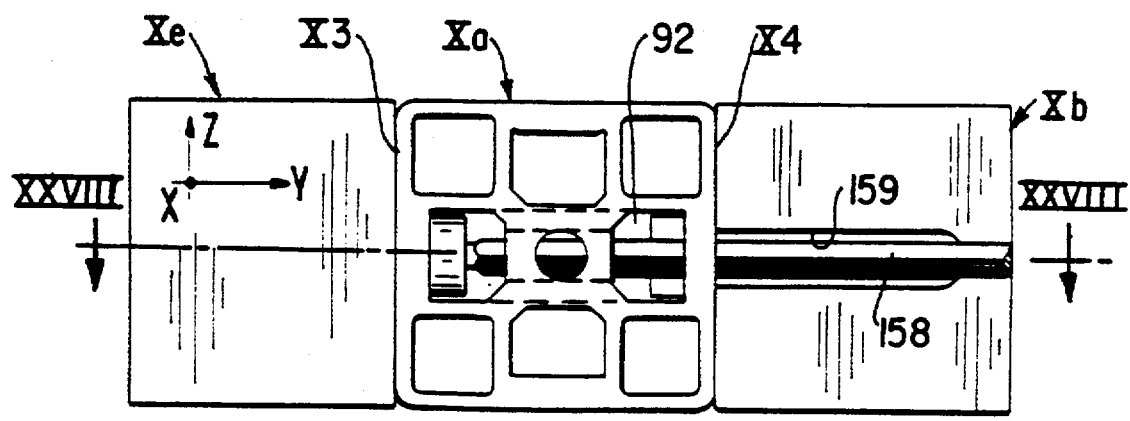
FIG. 27 is an enlarged front elevational view substantially as seen in the direction of arrow XXVII in FIG. 26.

The modular building system of FIGS. 24 and 25 is practically identical with the building system of FIGS. 22-23 except that the frame member Xa is provided with a transversely extending recess 141 of the type shown in FIG. 20. Thus, the head 145b of a male fastener 145 cannot pass through the second and third portions of the recess 141 but the shank 145a (which has a smooth cylindrical portion 145c extending transversely of and through the core 88 of the frame member Xa) can pass through the third portion 137 of the recess 141 and into the tapped transversely extending bore or hole 147 in the core 88 of the frame member Xd.

The appearance of the modular building systems which are shown in FIGS. 14-25 can be enhanced still further by employing plugs (not shown) of rubber, elastomeric plastic or other suitable material to fill the slot 134 when the introduction of a female fastener 133 into the chamber 92 of the frame member X of FIGS. 14-15 is completed, and to fill the first portions of recesses 135, 136, 141 when the introduction of the respective male fasteners 140, 139, 142, 144, 145 is completed. This not only enhances the appearance of the respective building systems but also reduces the likelihood of penetration of dust and/or other foreign matter into the chambers, channels and/or passages of the assembled frame members.

FIGS. 26 to 29 illustrate a portion of a further modular building system with three frame members Xa, Xb, Xe. The frame member Xa extends in the direction of the axis X, and the frame members Xb, Xe extend in the direction of the axis Y. One end face of the frame member Xb abuts the external surface X4 of the frame member Xa, and the external surface X3 of the frame member Xa abuts one end face of the frame member Xe.

The frame member Xa has a keyhole shaped recess or slot including a wider portion 151 and a narrower portion 149. This slot extends all the way between the external surfaces X3 and X4 of the frame member Xa. A first male fastener has a head 154 which abuts the inner side of the right-hand outer wall 104 and is thus located in the chamber 92 of the frame member Xa. The shank 152 of this first fastener extends through the narrower portion 149 of the keyhole shaped slot in the right-hand outer wall 104 of the frame member Xa and into the tapped portion 87a of the central hole 87 in the core 88 of the frame member Xb. The head 154 can be readily introduced into the interior of the frame member Xa by entering via the wider portion 151 of the keyhole shaped slot.

A second male fastener has a head 155 which abuts the inner side of the left-hand outer wall 104 of the frame member Xa and is located in the chamber 91. The shank 153 of the second male fastener extends through the narrower portion 149 of the keyhole shaped slot in the left-hand outer wall 104 of the frame member Xa and into the tapped portion 87a of the centrally located hole 87 in the core 88 of the frame member Xe. The head 155 can be readily introduced into the chamber 91 of the frame member Xa by passing through the wider portion 151 of the keyhole shaped slot between the external surfaces X3 and X4 of the member Xa.

In order to facilitate manipulation of the male fastener 153, 155, the building system which is shown in FIGS. 26–29 can be furnished with an elongated tool 158 having a substantially spherical but facetted working end which can reach the head 155 by passing through a recess or slot 159 in the lower outer wall 103 of the frame member Xb adjacent the illustrated end face of this frame member, and thereupon through the keyhole shaped slot of the frame member Xa. The working end of the tool 158 is configured in such a way that it can enter the socket of the head 155 and can thereupon rotate the fastener 153, 155 even though its axis does not coincide with the axis of the shank 153. Such types of tools are well known in the art.

The shanks 152, 153 can be partially introduced into the tapped portions 87a of the holes 87 in the respective cores 88 (of the frame members Xb, Xe) prior to placing of the end faces of the members Xb, Xe against the external surfaces X4, X3 of the frame member Xa. The member Xa is then moved to the position of FIG. 28 by causing the head 154 to pass through the wider portion 151 of the keyhole shaped slot, and the shank 152 is driven home after the frame member Xa is moved axially downwardly so that the shank 152 leaves the wider portion 151 and enters the narrower portion 149 of the slot in the right-hand outer wall 104 of the member Xa. The means for rotating the shank 152 can include the tool 158 or any other suitable tool. When the assembly of the members Xa, Xb is completed, the end face of the member Xe is moved against the external surface X3 of the member Xa so that the head 155 enters the wider portion 151 of the slot in the left-hand outer wall 104 of the member Xa. The members Xa, Xe are thereupon moved relative to each other so that the shank 153 enters the narrower portion 149 of the slot in the left-hand outer wall 104 of the member Xa, and the fastener 153, 155 is then tightened by using the tool 158.

Tools of the type shown at 158 can be used even if their axes make an angle of up to 20° with the axis of the fastener which is to be rotated by their substantially spherical working ends. The length of the slot 159 in the lower outer wall 103 of the frame member Xb will depend on the dimensions of the frame members Xa and Xb, particularly on the required degree of inclination of the axis of the tool 158 relative to the axis of the male fastener 153, 155.

Figure 28:
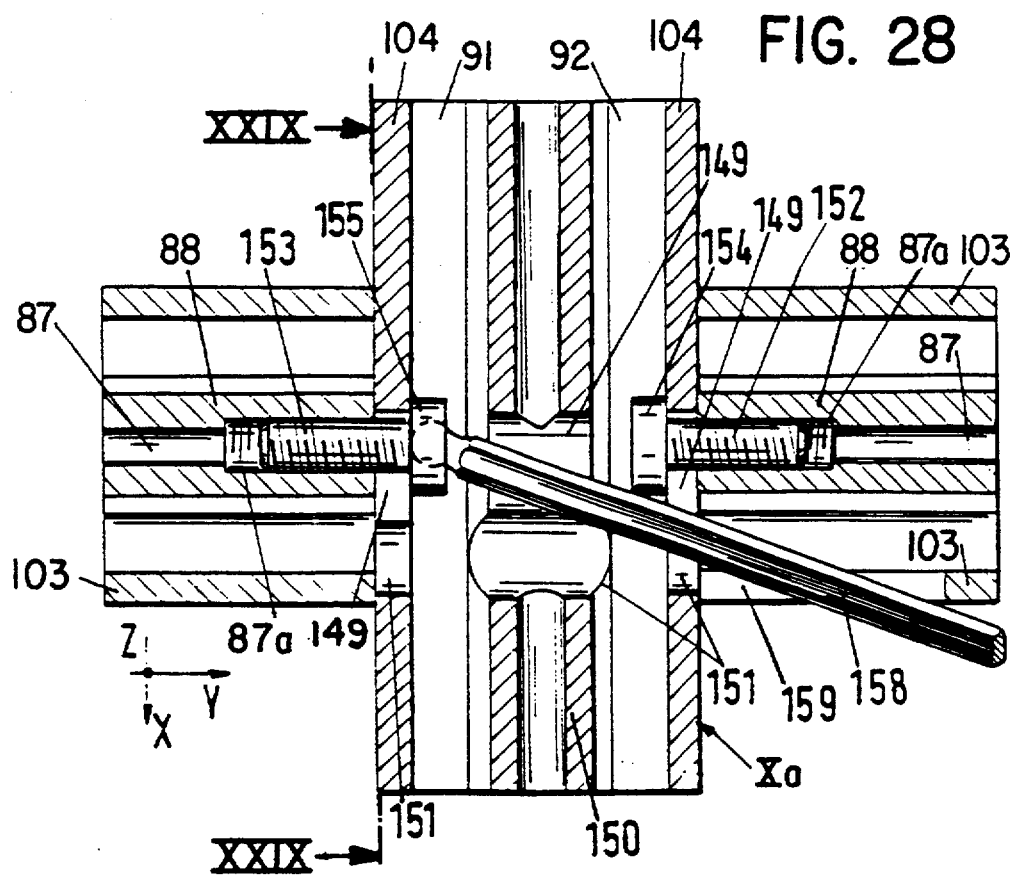
FIG. 28 is a sectional view substantially as seen in the direction of arrows from the line XXVIII—XXVIII of FIG. 27.
Figure 29:
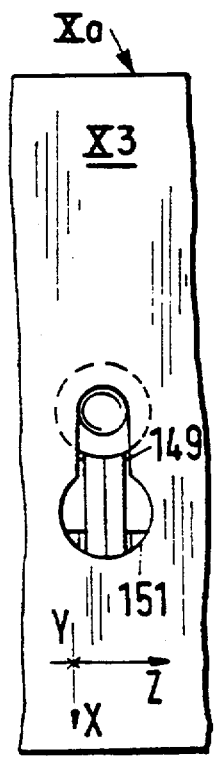
FIG. 29 is a fragmentary elevational view of the left-hand side of the central frame member of FIG. 28, substantially as seen in the direction of arrows from the line XXIX—XXIX in FIG. 28.

The heads 154, 155 of the male fasteners which are shown in FIG. 28 cannot enter the narrower portion 149 of the keyhole shaped slot between the external surfaces X3, X4 of the frame member Xa.

FIG. 30 shows a building system which employs a first frame member XXX having an elongated tube or duct 170 confining four sections IXa, IXb, IXc, IXd of the type shown in FIG. 9. The duct 170 has a relatively large rectangular cross-sectional outline. The sections IXa–IXd are fixedly installed in the duct 170 by threaded fasteners 173. Any selected section in the duct 170 can be separably connected with one or more frame members, for example, in a manner as described with reference to FIGS. 19–29.

The sections IXa–IXd can form a first assembly 171 which is installed adjacent one end of the duct 170. A second assembly 171', which may or may not be identical with the assembly 171, is located in the duct 170 and is spaced apart from the end containing the assembly 171 as well as from the other end of the duct. The assembly 171', or at least one section of the assembly 171', can be separably connected with a frame member 174 (e.g., a frame member of the type shown in FIG. 6, 7, 9, 11 or 12). The frame member 174 and the duct 170 then form a T-shaped building system. Such T-shaped system can be connected with one or more additional frame members, depending upon the desired dimensions, strength and intended use.

The sections IXa, IXb and/or IBc, IXd can be assembled into a frame member XI of the type shown in FIG. 11.

The connection between the frame member 174 and one or more sections of the assembly 171' can be of the type described with reference to FIGS. 16–21 or 26–29.

An important advantage of the improved frame members and of building systems which embody such frame members is that each frame member is much more resistant to torsional, compressive, bending and/or other stresses than heretofore known frame members. This is due to the fact that, save for the provision of inlets (such as the inlet 134 shown in FIGS. 14–15), recesses (such as the recesses 135, 136, 141 shown in FIGS. 16–25 and/or slots (such as 149, 151 and 159 shown in FIGS. 26–29) for introduction of fasteners and/or tools, the external surfaces of the improved frame members are uninterrupted and, therefore, can stand much greater stresses than the grooved or slotted frame members of the type shown, for example, in FIGS. 1 to 5c. Moreover, neighboring frame members can be moved into large surface-to-surface contact with each other. This enhances the stability of a building system employing two or more frame members of the type shown in FIGS. 6 to 30. Still further, the minimal number and minimal dimensions of slots, inlets and/or recesses in the external surfaces of the improved frame members reduces the likelihood of penetration of dust and/or other impurities and/or contaminants which enhances the versatility of the improved frame members and of building systems which employ such frame members. For example, the frame members can be used for the assembly of modular building systems which can find utilization in various food processing and analogous industries where the establishment and maintenance of sanitary conditions are not only desirable but prescribed by law in a large majority of countries all over the world.

The provision of one or more longitudinally extending channels and/or passages and the provision of two or more longitudinally extending chambers is desirable and advantageous in many instances because this entails considerable savings in material without appreciably affecting the stability of the improved frame members of the type shown in FIGS. 7–30. In addition, the provision of one or more channels and/or passages and/or two or more chambers contributes to a reduction of the weight and hence to convenience of manipulation of the improved frame members. The ability of frame members to stand extensive deforming stresses in spite of the provision of two or more chambers and/or one or more channels and/or passages is enhanced if the frame members are designed in a manner as described with reference to FIGS. 8, 9 and 10, namely that certain faces of at least some of the sidewalls are located in planes which cross or are at least immediately or closely adjacent the respective core or cores while the other faces of such sidewalls are or can be located in planes which bypass the core or cores. For example, the stability of the frame member VIII of FIG. 8 is highly satisfactory in spite of the fact that a substantial part of the sidewall 47 is located to the left of and a substantial part of the sidewall 46 is located at a level above the core 43. Thus, it is not even necessary that the entire sidewall merge into and extend at right angles to the adjacent facet of the respective core. This can be seen, for example, in FIG. 8, wherein the sidewalls 53, 54 merge into and extend at right angles to the adjacent facets 43b, 43a of the core 43 in contrast to the aforediscussed positioning of the sidewalls 46, 47. It has been found that at least the frame members of the type shown in FIGS. 8 to 10 are capable of standing pronounced pulling or tensional stresses, e.g., by male fasteners which mate with female fasteners (note the female fastener 133 in FIGS. 14–15) which are introduced into the chambers of the improved frame members. Furthermore, the improved frame members can stand pronounced bending or compressive stresses, for example, when the core is acted upon by the head of a male fastener in a manner as described with reference to FIGS. 19–21. Deformation of the frame member Xa in FIG. 20 in response to the application of a force which is used to deform the conventional frame member I of FIG. 2 is much less pronounced because the frame member Xa is capable of resisting such force due to the absence of longitudinally extending grooves or slots in its external surfaces. The same applies for the ability of the frame member Xa in FIG. 17 to withstand deforming or flexing stresses which are applied by the head 140b of the male fastener 140 against the inner side of the right-hand outer wall 104 of the frame member Xa. Tensional and/or compressive stresses which develop are applied to the core (such as the core 88) at right angles to its longitudinal axis which is desirable and advantageous for a number of reasons. Deformation due to the application of bending stresses is minimal and the profiled frame members can stand pronounced compressive and many other stresses. This enhances the ability of building systems which employ such frame members to withstand large forces, i.e., the stability of building systems employing frame members of the type shown in FIGS. 6–30 is superior to that of systems which employ conventional frame members, e.g., those disclosed in the published European patent application No. 0 010 475.

The wedge-shaped portions of the sidewalls (such as the wedge-shaped portions 107, 108 shown in FIG. 15) constitute an optional but desirable feature of the improved frame members. Such wedge-shaped portions and their facets facilitate proper centering and orientation of the heads of male fasteners and/or female fasteners in the corresponding chambers of the improved frame members.

A further important advantage of the improved frame members is that they can have a square (see, for example, FIG. 8 or 10), rectangular (see, for example, FIG. 9) or another (see, for example, FIG. 13) polygonal outline.

Reinforcing or stiffening walls or ribs of the type shown (at 121, 122) in FIG. 12 can be utilized with equal or similar advantage in certain other frame members, e.g., in the passage 112 of the frame member XI of FIG. 11 and/or in the passages 112 between the sections IXa–IXb and IXc–IXd in FIG. 30. The reinforcing or stiffening walls may but need not be flat and they can extend in parallelism with the external surfaces, diagonally of the respective frame members and/or in other directions.

The various inlets, slots and/or recesses can be machined into selected external surfaces of the improved frame members in the manufacturing plant or at the locale of assembly of such frame members into modular building systems. For example, the frame members can be assembled into work tables, machine frames and many other structural frameworks. The frame members can be furnished to purchasers with suitable drilling, boring and/or other tools which are to be used for the making of inlets, recesses and/or slots as well as with suitable patterns to facilitate proper selection of locations for removal of material in order to form a recess, inlet or slot.

If the frame member VI of FIG. 6 is to be connected with another frame member, e.g., with a second frame member VI, so that the two frame members cross each other not unlike the frame members Xa, Xd in FIGS. 22–25, a recess for the head of a male threaded fastener can be provided in the external surface VI2 of one of the frame members VI, and such recess can extend across the entire core 22 so that the head of the fastener abuts the inner side of the outer wall 26. This outer wall is then provided with an opening for the shank of the fastener, and the other frame member VI is provided with a transversely extending tapped bore or hole for such shank.

It is further clear that two or more frame members can be assembled into modular building systems wherein the frame members need not extend at right angles to each other. For example, the simple cruciform building systems which are shown in FIGS. 22 and 24 can be replaced by or used in conjunction with building systems wherein the frame members are assembled to form X-shaped systems.

A comparison of FIGS. 22–25 with FIGS. 16–21 and 26–29 will indicate that the longitudinal axes of interconnected frame members may but need not be located in a common plane. The axes of the frame members which are shown in FIGS. 16–21 and 26–29 are located in common planes.

The connections between neighboring frame members of a properly assembled modular building system can be reinforced by utilizing bolts and nuts in lieu of male fasteners alone. For example, the connection between the frame members Xa and Xd of FIG. 23 can be reinforced if the lower chamber 89 of the frame member Xd is provided with an inlet 134 to receive a nut 133 which meshes with the shank 144a of the male fastener 144.

Frame members of the type shown at XXX in FIG. 30 will or can be utilized when it becomes necessary to assemble relatively large building systems which include or can include a substantial number of interconnected frame members and wherein a selected frame member is to resist a substantial percentage of stresses which are applied to the assembled modular building system. In many instances, the building system is preferably assembled of lightweight frame members. A relatively large frame member will be used when the diameters of threaded shanks of screws, bolts or other fasteners are relatively large so that the frame members must be provided with large recesses for the heads and/or shanks of such fasteners. As a rule, the core or cores of the improved frame members are adjacent the external surfaces of the frame members because the provision of two or more cores in the interior of a frame member does not appreciably enhance the resistance of such frame member to bending and/or other stresses. Moreover, the making of such frame members necessitates the utilization of rather complex and expensive tools.

The frame member XXX of FIG. 30 can employ a duct 170 which is made of light metal, steel or other suitable material. The weight of such frame member is not excessive because its duct 170 need not be completely or substantially filled, i.e., the duct can contain one or more assemblies of suitably configured and/or distributed sections each of which includes one or more frame members of the type shown, for example, in FIGS. 6 to 13.

The overall weight of the frame member XXX is reduced because the sections IXa–IXd and/or similar or analogous sections do not extend all the way between the longitudinal ends of the duct 170. The assemblies 171, 171' and/or other assemblies can be secured in the duct 170 by resorting to an adhesive, by welding or soldering, by resorting to pins and/or by resorting to other well known techniques. The same applies for the making of the assemblies 171 and 171', i.e., the constituents of such assemblies can be bonded and/or otherwise secured to each other and/or to a tube for the respective sections IXa–IXd.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A one piece unitary hollow profiled frame member for use in a modular building system, said member including an elongated body having a plurality of at least substantially plane longitudinally extending external surfaces devoid of longitudinally extending grooves and comprising at least one longitudinally extending core having a longitudinally extending hole centered on a longitudinal axis; at least one outer wall adjacent one of said external surfaces and spaced apart from said at least one core; and at least one pair of sidewalls spaced apart from each other and connecting said at least one core with said at least one outer wall, said walls and a surface of said at least one core defining an elongated chamber which is disposed between said surface of said at least one core and said at least one outer wall and is flanked by said at least one pair of sidewalls; said at least one pair of sidewalls each having first ends remote from said at least one core and second ends adjacent to said at least one core, said second ends of said at least one pair of sidewalls defining a plane that is substantially coextensive with said surface of said at least one core; said at least one pair of sidewalls being symmetrical about a plane bisecting the longitudinal axis of said core, said plane being perpendicular to said outer wall and located between said at least one pair of side walls, said at least one pair of sidewalls being substantially parallel to one another; said longitudinally extending hole being separated from said elongated chamber by said core, said core being outside said chamber and abutting said chamber at said surface of said core.

2. The frame member of claim 1, wherein said at least one core and said walls consist of light metal.

3. The frame member of claim 1, wherein said body comprises at least one additional outer wall adjacent another of said external surfaces and spaced apart from said at least one core, and at least one additional pair of sidewalls spaced apart from each other and connecting said at least one core with said at least one additional outer wall, said at least one core defining with said additional walls an elongated second chamber which is disposed between said at least one core and said at least one additional outer wall and is flanked by said at least one pair of additional sidewalls, one sidewall of each of said pairs having a first face adjacent the respective chamber and a second face opposite the respective first face, said first faces being disposed in first planes which are at least immediately adjacent said at least one core and said second faces being disposed in second planes which bypass said at least one core.

4. The frame member of claim 3, wherein said sidewalls are at least substantially normal to the respective outer walls, said at least one core having facets adjacent said chambers, one of said facets being at least closely adjacent and at least substantially parallel to said first plane, another of said facets being at least closely adjacent and at least substantially parallel to said second plane.

5. The frame member of claim 1, wherein at least one of said walls is provided with at least one inlet for admission of at least a portion of a fastener into said chamber.

6. The frame member of claim 5, wherein the at least one portion of the fastener is the head of a screw or bolt.

7. The frame member of claim 5, wherein said at least one fastener is a nut.

8. The frame member of claim 1, wherein said sidewalls include confronting substantially wedge-like portions adjacent said chamber and being of one piece with said at least one core.

9. The frame member of claim 1, wherein said body has a single core and a single chamber.

10. The frame member of claim 1, wherein said body further comprises at least one additional outer wall and an additional pair of sidewalls connecting said at least one core with said at least one additional outer wall, said additional walls and said at least one core defining a second chamber, the sidewalls of said at least one pair being inclined relative to the sidewalls of said additional pair and said body further having an elongated channel disposed between one sidewall of said at least one pair and one sidewall of said additional pair.

11. The frame member of claim 10, wherein said body includes at least one corner portion and said channel is provided at said corner portion.

12. The frame member of claim 1, wherein said body has first, second and third elongated chambers and two elongated channels, said at least one core being disposed between said first and third chambers and said second chamber being disposed between said channels, one of said channels being disposed between said first and second chambers and the other of said channels being disposed between said second and third chambers.

13. The frame member of claim 12, wherein said first and third chambers have halves which are mirror symmetrical to each other with reference to a first plane, said second chamber having two halves which are mirror symmetrical to each other with reference to a second plane normal to said first plane.

14. The frame member of claim 1, wherein said body has four elongated chambers and four elongated channels, said channels and said chambers surrounding said at least one core and said channels alternating with said chambers.

15. The frame member of claim 14, wherein said chambers include a first pair and each chamber of said first pair has two halves which are mirror symmetrical to each other with reference to a first plane which halves said at least one core, said chambers further including a second pair and each chamber of said second pair having two halves which are mirror symmetrical to each other with reference to a second plane normal to said first plane and halving said at least one core.

16. The frame member of claim 15, wherein said channels include a first pair of channels and the channels of said first pair have halves which are mirror symmetrical to each other with reference to a third plane halving said at least one core and making with said first and second planes angles of 45°, said channels further including a second pair of channels and the channels of said second pair having halves which are mirror symmetrical to each other with reference to a fourth plane halving said at least one core and normal to said third plane.

17. The frame member of claim 1, wherein said body has two parallel elongated sections each of which includes an elongated core, said cores being mirror images of each other with reference to a plane which is disposed between and is spaced apart from said cores, said body further having an elongated passage disposed between said cores and halved by said plane, and said body further having intermediate walls flanking said passage and being spaced apart from said cores.

18. The frame member of claim 17, wherein each of said sections further includes first, second and third elongated chambers and two elongated channels, each of said cores being disposed between the first and third chambers of the respective section and the second chamber of each section being disposed between the respective channels, one channel of each of said sections being disposed between the respective first and second chambers and the other channel of each of said sections being disposed between the respective second and third chambers.

19. The frame member of claim 1, wherein said body has two pairs of corners and includes a first section at each of said corners and at least two second sections between said pairs of corners, each of said first sections including a core, two chambers and an elongated channel flanked by the respective chambers, each of said second sections including a single core and a single chamber.

20. The frame member of claim 19, wherein each of said channels is immediately adjacent the respective corner.

21. The frame member of claim 20, wherein said body has a rectangular cross-sectional outline and said external surfaces include two wider and two narrower external surfaces, said second sections including at least one first second section adjacent one of said wider external surfaces and at least one second section adjacent the other of said wider external surfaces.

22. The frame member of claim 20, wherein said body further comprises internal reinforcing walls connecting each of said sections with at least one other section.

23. The frame member of claim 1, wherein said body has at least five external surfaces and at least five corners each flanked by two of said external surfaces, said body comprising at least five sections, one for each of said external surfaces and each including a single core and a single chamber disposed between the respective core and the respective external surface, said cores jointly defining a substantially centrally located elongated passage.

24. The frame member of claim 23, wherein said body has an elongated channel at each of said corners, each of said channels being flanked by two sections of said body.

25. The frame member of claim 1, wherein said body has a recess provided in one of said external surfaces, extending at least to said at least one core and dimensioned to receive a head of a threaded fastener, said hole being tapped to mesh with a shank of a threaded fastener.

26. The frame member of claim 25, wherein said body has a bottom surface provided in said recess to serve as an abutment for a head of a threaded fastener.

27. The frame member of claim 25, wherein said external surfaces further include a second external surface located opposite the external surface having said recess, said recess having a portion provided in said second external surface and dimensioned to permit passage of a shank of the fastener.

28. The frame member of claim 1, wherein said body has a transversely extending recess including a first portion in said at least one outer wall and a second portion in said at least one core, said first portion of said at least one recess being dimensioned to receive a head of a threaded fastener and said second portion being dimensioned to permit introduction of a shank of the threaded fastener.

29. The frame member of claim 28, wherein said body has an additional outer wall opposite said at least one outer wall and a second chamber between said at least one core and said additional outer wall, said transversely extending recess including a third portion provided in the additional outer wall and dimensioned to permit introduction of the shank of the fastener.

30. The frame member of claim 1, wherein said at least one core has a transversely extending recess which is dimensioned to permit entry into said chamber of a head of a threaded fastener so that the head comes into abutment with said at least one outer wall within said chamber, said at least one outer wall having an opening for a shank of the threaded fastener while the head of such fastener abuts the at least one outer wall in said chamber.

31. The frame member of claim 1, wherein said at least one outer wall has at least one inlet for introduction of an internally threaded fastener into said chamber.

32. The frame member of claim 31, wherein the sidewalls of said at least one pair have mutually inclined facets adjacent said at least one core and disposed in said chamber to constitute abutments for a substantially complementary facet of an internally threaded fastener in said chamber.

33. The frame member of claim 32, wherein said chamber is dimensioned to permit changes of orientation of a fastener which enters the chamber by way of said inlet and the complementary facet of the fastener in said chamber has a substantially convex shape.

34. The framed member of claim 1, wherein said frame member is made from a single material.

35. A modular building system comprising at least two adjacent mutually inclined elongated frame members, at least one of said frame members including a one-piece unitary elongated body having a plurality of at least substantially plane longitudinally extending external surfaces which are devoid of longitudinally extending grooves, said body comprising at least one longitudinally extending core having a longitudinally extending at least partially tapped hole centered on a longitudinal axis, at least one outer wall adjacent one of said external surfaces and spaced apart from said at least one core, and at least one pair of sidewalls spaced apart from each other and connecting said at least one core with said at least one outer wall, said walls and a surface of said at least one core defining an elongated chamber which is disposed between said at least one outer wall and said surface of said at least one core and is flanked by said at least one pair of sidewalls, the other of said frame members having an end face adjacent an external surface of said at least one frame member and further comprising a threaded fastener having a head anchored in a transverse recess of said at least one frame member and an externally threaded shank extending into an at least partially tapped hole in the end face of said other frame member; said at least one pair of sidewalls each having first ends remote from said at least one core and second ends adjacent to said at least one core, said second ends of said at least one pair of sidewalls defining a plane that is substantially coextensive with said surface of said at least one core; said at least one pair of sidewalls being symmetrical about a plane bisecting the longitudinal axis of said core, said plane being perpendicular to said outer wall and located between said at least one pair of side walls, said at least one pair of sidewalls being substantially parallel to one another; said longitudinally extending hole being separated from said elongated chamber by said core, said core being outside said chamber and abutting said chamber at said surface of said core.

36. A modular building system comprising at least two adjacent mutually inclined elongated one piece unitary hollow frame members, at least one of said frame members including an elongated body having a plurality of at least substantially plane longitudinally extending external surfaces which are devoid of longitudinally extending grooves, said body comprising at least one longitudinally extending core having a longitudinally extending hole centered on a longitudinal axis, at least one outer wall adjacent one of said external surfaces and spaced apart from said at least one core, and at least one pair of sidewalls spaced apart from each other and connecting said at least one core with said at least one outer wall, said walls and said at least one core defining an elongated chamber which is disposed between said at least one outer wall and said at least one core and is flanked by said at least one pair of sidewalls, one of said external surfaces abutting an external surface of the other of said frame members; said member being symmetrical about a plane bisecting the longitudinal axis of said core, said plane being perpendicular to said outer wall and located between said at least one pair of side walls, said at least one pair of sidewalls being substantially parallel to one another; said longitudinally extending hole being separated from said elongated chamber by said core, and further comprising at least one fastener separably securing said frame members to each other, said fastener having a head which is anchored in a transversely extending recess of said at least one frame member and an externally threaded shank extending into a tapped bore provided in an at least one of said at least one outer wall and said at least one core of said other frame member.

37. A modular building system comprising:
a one piece unitary hollow first elongated frame member having first and second external surfaces disposed opposite each other and a transversely extending substantially keyhole shaped slot extending between said external surfaces and including a wider portion and a narrower portion;
a second elongated frame member having a first end face adjacent said first external surface;
at least one of said frame members includes an elongated body having a plurality of external surfaces devoid of longitudinally extending grooves, at least one outer wall adjacent one of said plurality of external surfaces, at least one longitudinally extending core spaced apart from said at least one outer wall and having a longitudinally extending hole centered on a longitudinal axis, and at least one pair of longitudinally extending sidewalls spaced apart from each other and connecting said at least one core with said at least one outer wall, said walls and said at least one core defining a longitudinally extending chamber disposed between said at least one core and said at least one outer wall and flanked by said at least one pair of sidewalls;
a duct of an elongated frame member having a polygonal cross-sectional outline and a plurality of smooth substantially uninterrupted external surfaces, and at least one longitudinally extending profiled section in said duct, said duct having at least one opening provided in at least one of said external surfaces for reception of at least a portion of a fastener to be used for connection of the at least one profiled section with said second frame member, said at least one profiled section including at least one longitudinally extending core having a longitudinally extending hole centered on a longitudinal axis, at least one longitudinally extending outer wall adjacent one of said external surfaces and spaced apart from said at least one core, and at least one pair of longitudinally extending sidewalls spaced apart from each other and connecting said at least one outer wall with said at least one core, said walls and said at least one core defining an elongated chamber disposed between said at least one core and said at least one outer wall and flanked by said at least one pair of sidewalls;
a first threaded fastener having a head dimensioned to enter said hollow first frame member through the wider portion of said slot and a shank extending through the narrower portion of said slot in said first external surface and into a tapped hole in said first end face, said second frame member having a second slot adjacent said first end face and also adjacent the wider portion of the keyhole shaped slot in said first external surface;

a third elongated frame member having a second end face adjacent said second external surface; and a second threaded fastener having a head dimensioned to enter said hollow first frame member through the wider portion of said keyhole shaped slot and a shank extending through the narrower portion of said keyhole shaped slot in said second external surface and into a tapped hole in said second end face, said second slot being positioned and dimensioned to permit entry of a tool which is to be used to engage and rotate the head of said second fastener.

* * * * *